US012506276B2

(12) United States Patent
Sun et al.

(10) Patent No.: US 12,506,276 B2
(45) Date of Patent: Dec. 23, 2025

(54) BROADBAND DECOUPLING RADIATING ELEMENTS AND BASE STATION ANTENNAS HAVING SUCH RADIATING ELEMENTS

(71) Applicant: Outdoor Wireless Networks LLC, Claremont, NC (US)

(72) Inventors: Bin Sun, Suzhou (CN); Bo Wu, Richardson, TX (US); Jian Zhang, Suzhou (CN); Cheng Xue, Suzhou (CN); YueMin Li, Suzhou (CN); Peter J. Bisiules, La Grange Park, IL (US); Ligang Wu, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 28 days.

(21) Appl. No.: 18/752,981

(22) Filed: Jun. 25, 2024

(65) Prior Publication Data

US 2024/0347927 A1 Oct. 17, 2024

Related U.S. Application Data

(63) Continuation of application No. 17/939,343, filed on Sep. 7, 2022, now Pat. No. 12,051,855.
(Continued)

(51) Int. Cl.
*H01Q 21/06* (2006.01)
*H01Q 1/24* (2006.01)
(Continued)

(52) U.S. Cl.
CPC ........... *H01Q 21/062* (2013.01); *H01Q 1/246* (2013.01); *H01Q 5/385* (2015.01); *H01Q 19/10* (2013.01); *H01Q 21/08* (2013.01); *H01Q 21/26* (2013.01)

(58) Field of Classification Search
CPC ........ H01Q 1/246; H01Q 1/523; H01Q 5/385; H01Q 5/42; H01Q 5/48; H01Q 19/10;
(Continued)

(56) References Cited

U.S. PATENT DOCUMENTS 10,770,803 B2 9/2020 Varnoosfaderani et al.
11,870,160 B2 * 1/2024 Isik .......................... H01Q 9/16
(Continued)

FOREIGN PATENT DOCUMENTS

CN 106450751 A 2/2017
CN 111555030 A 8/2020
(Continued)

OTHER PUBLICATIONS

"International Search Report and Written Opinion for International Application PCTUS22075432, mailed Dec. 21, 2022, 7 pages".
(Continued)

*Primary Examiner* — Raymond R Chai
(74) *Attorney, Agent, or Firm* — Myers Bigel, P.A.

(57) ABSTRACT

An antenna comprises first and second radiating elements that are configured to operate in respective first and second operating frequency bands, and a parasitic element that includes a overlapping first and second conductive paths. The first conductive path includes a plurality of first segments and the second conductive path includes a plurality of second segments. A subset of the first segments overlap respective ones of the second segments to form a plurality of pairs of overlapping first and second segments and at least some of these pairs are configured so that an instantaneous direction of a first current formed on the first segment in response RF radiation emitted by the second radiating element will be opposite an instantaneous direction of a second current formed on the second segment in response to the RF radiation emitted by the second radiating element.

20 Claims, 15 Drawing Sheets

Related U.S. Application Data

(60) Provisional application No. 63/342,759, filed on May 17, 2022, provisional application No. 63/241,676, filed on Sep. 8, 2021.

(51) Int. Cl.

| | |
|---|---|
| ***H01Q 5/385*** | (2015.01) |
| ***H01Q 19/10*** | (2006.01) |
| ***H01Q 21/08*** | (2006.01) |
| ***H01Q 21/26*** | (2006.01) |

(58) Field of Classification Search
CPC .... H01Q 19/108; H01Q 21/062; H01Q 21/08; H01Q 21/26
See application file for complete search history.

(56) References Cited

U.S. PATENT DOCUMENTS

| | | | | |
|---|---|---|---|---|
| 2017/0310009 | A1 | 10/2017 | Isik et al. | |
| 2020/0127389 | A1* | 4/2020 | Li | H01Q 25/001 |
| 2020/0335881 | A1 | 10/2020 | Le | |
| 2020/0373668 | A1 | 11/2020 | Wu et al. | |
| 2022/0384966 | A1* | 12/2022 | Chiang | H01Q 5/385 |
| 2023/0020807 | A1* | 1/2023 | Shao | H01Q 5/321 |
| 2023/0387607 | A1* | 11/2023 | Le | H01Q 21/26 |

FOREIGN PATENT DOCUMENTS

| | | | |
|---|---|---|---|
| CN | 112164869 | A | 1/2021 |
| CN | 112186333 | A | 1/2021 |
| CN | 112186341 | A | 1/2021 |
| CN | 112290199 | A | 1/2021 |
| CN | 112421219 | A | 2/2021 |
| CN | 112768895 | A | 5/2021 |
| CN | 112787061 | A | 5/2021 |
| CN | 112821044 | A | 5/2021 |
| CN | 213304351 | U | 5/2021 |

OTHER PUBLICATIONS

"Extended European Search Report for European Application No. 22868221.79, dated May 28, 2025, 27 pages".

* cited by examiner

BROADBAND DECOUPLING RADIATING ELEMENTS AND BASE STATION ANTENNAS HAVING SUCH RADIATING ELEMENTS

CROSS-REFERENCE TO RELATED APPLICATION

The present application is a continuation application under 35 U.S.C. § 120 of U.S. patent application Ser. No. 17/939,343, filed Sep. 7, 2022, which in turn claims priority under 35 U.S.C. § 119 to U.S. Provisional Patent Application Ser. No. 63/241,676, filed Sep. 8, 2021 and to U.S. Provisional Patent Application Ser. No. 63/342,759, filed May 17, 2022, the entire content of each of which is incorporated herein by reference.

BACKGROUND

The present invention generally relates to radio communications and, more particularly, to base station antennas for cellular communications systems.

Cellular communications systems are well known in the art. In a cellular communications system, a geographic area is divided into a series of regions that are referred to as "cells" which are served by respective base stations. The base station may include one or more antennas that are configured to provide two-way radio frequency ("RF") communications with mobile subscribers that are within the cell served by the base station. In many cases, each base station is divided into "sectors." In one common configuration, a hexagonally shaped cell is divided into three 120° sectors in the azimuth plane, and each sector is served by one or more base station antennas that have an azimuth Half Power Beamwidth ("HPBW") of approximately 65°. Typically, the base station antennas are mounted on a tower or other raised structure, with the radiation patterns (also referred to herein as "antenna beams") that are generated by the base station antennas directed outwardly. Base station antennas are often implemented as linear or planar phased arrays of radiating elements.

In order to accommodate the increasing volume of cellular communications, cellular operators have added cellular service in a variety of new frequency bands. While in some cases it is possible to use a single array of so-called "wide-band" or "ultra wide-band" radiating elements to provide service in multiple frequency bands, in other cases it is necessary to use different arrays of radiating elements to support service in the different frequency bands.

As the number of frequency bands has proliferated, and increased sectorization has become more common (e.g., dividing a cell into six, nine or even twelve sectors), the number of base station antennas deployed at a typical base station has increased significantly. However, due to, for example, local zoning ordinances and/or weight and wind loading constraints for the antenna towers, there is often a limit as to the number of base station antennas that can be deployed at a given base station. In order to increase capacity without further increasing the number of base station antennas, so-called multi-band base station antennas have been introduced which include multiple arrays of radiating elements. Multi-band base station antennas are now being developed that include arrays that operate in three different frequencies bands. For example, base station antennas are now being deployed that include two linear arrays of "low-band" radiating elements that operate in some or all of the 694-960 MHz frequency band, two linear arrays of "mid-band" radiating elements that operate in some or all of the 1427-2690 MHz frequency band and one or more multi-column (planar) arrays of "high-band" radiating elements that operate in some or all of a higher frequency band, such as the 3.3-4.2 GHz frequency band. Unfortunately, the different arrays can interact with each other, which may make it challenging to implement such a multi-band antenna while also meeting customer requirements relating to the size (and particularly the width) of the base station antenna.

SUMMARY

Pursuant to embodiments of the present invention, antennas (e.g., a base station antenna) are provided that comprise a reflector, a first radiating element extending forwardly from the reflector that is configured to operate in a first operating frequency band, and a second radiating element extending forwardly from the reflector that is configured to operate in a second operating frequency band that encompasses higher frequencies than the first operating frequency band. The first radiating element includes a first dipole radiator having a first dipole arm and a second dipole arm and a second dipole radiator having a third dipole arm and a fourth dipole arm. The first dipole arm includes a first conductive path and a second conductive path that is positioned behind the first conductive path. The first conductive path includes a plurality of first segments and the second conductive path includes a plurality of second segments, where a subset of the first segments overlap respective ones of the second segments in a subset of the second segments to form a plurality of pairs of overlapping first and second segments. At least some of the pairs of overlapping first and second segments are configured so that the instantaneous direction of a first current formed on the first segment in response to RF radiation emitted by the second radiating element will be substantially opposite the instantaneous direction of a second current formed on the second segment in response to the RF radiation emitted by the second radiating element.

In some embodiments, the first conductive path may be a first meandered conductive path and the second conductive path may be a second meandered conductive path.

In some embodiments, the first conductive path may be implemented in a first metal layer of a printed circuit board and the second conductive path may be implemented in a second metal layer of the printed circuit board.

In some embodiments, the first meandered conductive path may be a plurality of first longitudinal segments that generally extend parallel to a longitudinal direction of the first dipole arm and a plurality of first transverse segments that generally extend perpendicular to the longitudinal direction of the first dipole arm. In some embodiments, the second meandered conductive path may be a plurality of second longitudinal segments that generally extend parallel to the longitudinal direction of the first dipole arm and a plurality of second transverse segments that generally extend perpendicular to the longitudinal direction of the first dipole arm. In some embodiments, at least some of the pairs of overlapping first and second segments may be a respective one of the first transverse segments and a respective one of the second transverse segments. In some embodiments, substantially all of the first transverse segments may overlap a respective one of the second transverse segments.

In some embodiments, in at least some of the pairs of overlapping first and second segments, one of the first and second segments may completely overlap the other of the first and second segments.

In some embodiments, at least one of the first transverse segments may be wider than at least one of the first longitudinal segments.

In some embodiments, the first radiating element may further include a feed stalk having a feed line, and the first conductive path may be galvanically connected to the feed line and the second conductive path may be galvanically coupled to the feed stalk.

In some embodiments, the first conductive path and the second conductive path of each of the first through fourth dipole arms may form respective closed loops.

In some embodiments, the first meandered conductive path may be a wave structure having a first frequency, and the second meandered conductive path may be a wave structure having a second frequency that is different than the first frequency.

In some embodiments, the second dipole arm may include a third conductive path that is substantially identical to the first conductive path, and a fourth conductive path that is substantially identical to the second conductive path, and the first dipole arm may overlap the second radiating element.

In some embodiments, the antenna may further comprise a third radiating element extending forwardly from the reflector that is configured to operate in a third operating frequency band that encompasses higher frequencies than the second operating frequency band, where the second dipole arm overlaps the third radiating element. In some of these embodiments, the first and second dipole arms may be configured to be substantially transparent to RF signals in the second operating frequency band and in the third operating frequency band.

In some embodiments, the first radiating element may further comprise at least one feed stalk that extends generally perpendicular to the reflector, and each of the first through fourth dipole arms may include first and second spaced-apart conductive segments that together form a generally oval shape.

In some embodiments, an average length of the first transverse segments may be less than ¼ of a wavelength corresponding to a center frequency of the second operating frequency band.

In some embodiments, an average width of the first meandered conductive path may be less than 0.05 of a wavelength corresponding to a center frequency of the second operating frequency band, and an average width of the second meandered conductive path may be less than 0.05 of the wavelength corresponding to the center frequency of the second operating frequency band.

Pursuant to further embodiments of the present invention, radiating elements are provided that comprise a first dipole radiator having a first dipole arm and a second dipole arm and a second dipole radiator having a third dipole arm and a fourth dipole arm, where the first dipole arm includes a first meandered conductive path that extends from a base of the first dipole arm to a distal end of the first dipole arm and a second meandered conductive path that is positioned behind the first meandered conductive path.

In some embodiments, an average width of the first meandered conductive path may be less than 0.05 of a wavelength corresponding to a center frequency of the second operating frequency band, and an average width of the second meandered conductive path may be less than 0.05 of the wavelength corresponding to the center frequency of the second operating frequency band.

In some embodiments, the first meandered conductive path may be a plurality of first longitudinal segments that generally extend parallel to a longitudinal direction of the first dipole arm and a plurality of first transverse segments that generally extend perpendicular to the longitudinal direction of the first dipole arm, and the second meandered conductive path may be a plurality of second longitudinal segments that generally extend parallel to the longitudinal direction of the first dipole arm and a plurality of second transverse segments that generally extend perpendicular to the longitudinal direction of the first dipole arm.

In some embodiments, an average length of the first transverse segments may be less than ¼ of a wavelength corresponding to a center frequency of the second operating frequency band.

In some embodiments, at least some of the first transverse segments may overlap respective ones of the second transverse segments.

In some embodiments, substantially all of the first transverse segments may overlap a respective ones of the second transverse segments.

In some embodiments, at least some of the first transverse segments may completely overlap respective ones of the second transverse segments.

In some embodiments, at least one of the first transverse segments may be wider than at least one of the first longitudinal segments.

In some embodiments, the first radiating element further includes a feed stalk having a feed line, and the first meandered conductive path may be galvanically connected to the feed line and the second meandered conductive path may be galvanically coupled to the feed stalk.

In some embodiments, the first meandered conductive path and the second meandered conductive path may form respective closed loops.

In some embodiments, the first meandered conductive path may be a wave structure having a first frequency, and the second meandered conductive path may be a wave structure having a second frequency that is different than the first frequency.

In some embodiments, the first meandered conductive path may have a generally oval shape.

In some embodiments, the second meandered conductive path may have a generally oval shape.

In some embodiments, the first meandered conductive path may be a plurality of first wave sections that each have a wave structure, and a plurality of first transition sections that connect respective adjacent pairs of the first wave sections.

In some embodiments, the second meandered conductive path may be a plurality of second wave sections that each have a wave structure, and a plurality of second transition sections that connect respective adjacent pairs of the second wave sections.

Pursuant to still further embodiments of the present invention, antennas such as base station antennas are provided that comprise a reflector, a first radiating element extending forwardly from the reflector that is configured to operate in a first operating frequency band, the first radiating element including a first dipole arm, and a second radiating element extending forwardly from the reflector that is configured to operate in a second operating frequency band that encompasses higher frequencies than the first operating frequency band. The first dipole arm includes a first conductive path and a second conductive path that are spaced apart from each other. A first segment of the first conductive path overlaps a second segment of the second conductive path. The first dipole arm is configured so that first and second currents that are induced on the respective first and second conductive paths in response to radio frequency ("RF") radiation emitted by the second radiating element each flow outwardly along the first dipole arm, but flow in substantially opposite directions along the respective first and second segments.

In some embodiments, the first radiating element may be a first dipole radiator that includes the first dipole arm and a second dipole arm, and a second dipole radiator having a third dipole arm and a fourth dipole arm, and each dipole arm includes a base that is adjacent a center of the first radiating element and a distal end that is positioned outwardly of the base.

In some embodiments, the first conductive path may be a first meandered conductive path and the second conductive path may be a second meandered conductive path.

In some embodiments, the first conductive path may be implemented in a first metal layer of a printed circuit board and the second conductive path may be implemented in a second metal layer of the printed circuit board.

In some embodiments, the first meandered conductive path may be a plurality of first longitudinal segments that generally extend parallel to a longitudinal direction of the first dipole arm and a plurality of first transverse segments that generally extend perpendicular to the longitudinal direction of the first dipole arm, and the second meandered conductive path may be a plurality of second longitudinal segments that generally extend parallel to the longitudinal direction of the first dipole arm and a plurality of second transverse segments that generally extend perpendicular to the longitudinal direction of the first dipole arm.

In some embodiments, the first segment may be one of the first transverse segments, and the second segment may be one of the second transverse segments.

In some embodiments, an average length of the first transverse segments may be less than ¼ of a wavelength corresponding to a center frequency of the second operating frequency band.

In some embodiments, an average width of the first meandered conductive path may be less than 0.05 of a wavelength corresponding to a center frequency of the second operating frequency band, and an average width of the second meandered conductive path may be less than 0.05 of the wavelength corresponding to the center frequency of the second operating frequency band.

In some embodiments, the first meandered conductive path may be a wave structure having a first frequency, and the second meandered conductive path may be a wave structure having a second frequency that is different than the first frequency.

Pursuant to further embodiments of the present invention, antennas (e.g., a base station antenna) are provided that include a reflector, a first radiating element extending forwardly from the reflector that is configured to operate in a first operating frequency band, and a second radiating element extending forwardly from the reflector that is configured to operate in a second operating frequency band that encompasses higher frequencies than the first operating frequency band. These antennas also include one or more parasitic elements that each include a first conductive path and a second conductive path that is positioned behind the first conductive path. The first conductive path includes a plurality of first segments and the second conductive path includes a plurality of second segments. A subset of the first segments overlap respective ones of the second segments in a subset of the second segments to form a plurality of pairs of overlapping first and second segments. At least some of the pairs of overlapping first and second segments are configured so that the instantaneous direction of a first current formed on the first segment in response to RF radiation emitted by the second radiating element will be substantially opposite the instantaneous direction of a second current formed on the second segment in response to the RF radiation emitted by the second radiating element.

In some embodiments, the first and second conductive paths may each be meandered conductive paths. In some embodiments, the first meandered conductive path may include a plurality of first longitudinal segments that generally extend parallel to a longitudinal axis of the antenna and a plurality of first transverse segments that generally extend perpendicularly to the first longitudinal segments, and the second meandered conductive path may include a plurality of second longitudinal segments that generally extend parallel to the longitudinal axis of the antenna and a plurality of second transverse segments that generally extend perpendicularly to the second longitudinal segments. In such embodiments, at least some of the pairs of overlapping first and second segments comprise a respective one of the first transverse segments and a respective one of the second transverse segments. In some embodiments, substantially all of the first transverse segments may overlap a respective one of the second transverse segments. In some embodiments, in at least some of the pairs of overlapping first and second segments, one of the first and second segments may completely overlap the other of the first and second segments.

In some embodiments, the first and second meandered conductive paths may each have a wave structure (e.g., a sine wave, a square wave, etc.). A frequency of the wave structure of the first meandered conductive path may be different from a frequency of the wave structure of the second meandered conductive path.

In some embodiments, the antenna may further include a third radiating element extending forwardly from the reflector that is configured to operate in a third operating frequency band that encompasses higher frequencies than the second operating frequency band. The parasitic element may be configured to be substantially transparent to RF signals in the second operating frequency band and in the third operating frequency band.

In some embodiments, an average width of the first meandered conductive path may be less than 0.05 of a wavelength corresponding to a center frequency of the second operating frequency band, and an average width of the second meandered conductive path may be less than 0.05 of the wavelength corresponding to the center frequency of the second operating frequency band.

Pursuant to still further embodiments of the present invention, antennas are provided that include a first radiating element that is configured to operate in a first operating frequency band, a second radiating element that is configured to operate in a second operating frequency band that does not overlap with the first frequency band and that encompasses higher frequencies than the first operating frequency band, and a parasitic element that is positioned adjacent the first and second radiating elements, the parasitic element including a first conductive path having a wave structure with a first frequency and a second conductive path having a wave structure with a second frequency that is positioned behind the first conductive path, where the first frequency is different from the second frequency.

In some embodiments, an average width of the first conductive path may be less than 0.05 of a wavelength corresponding to a center frequency of the second operating frequency band, and an average width of the second conductive path may be less than 0.05 of the wavelength corresponding to the center frequency of the second operating frequency band.

In some embodiments, the first conductive path may include a plurality of first longitudinal segments that generally extend parallel to a longitudinal axis of the antenna and a plurality of first transverse segments that generally extend perpendicularly to the first longitudinal segments, and the second conductive path may include a plurality of second longitudinal segments that generally extend parallel to the longitudinal axis of the antenna and a plurality of second transverse segments that generally extend perpendicularly to the second longitudinal segments. At least some of the first transverse segments may overlap respective ones of the second transverse segments. In some embodiments, substantially all of the first transverse segments may overlap a respective one of the second transverse segments. In some embodiments, at least some of the first transverse segments may completely overlap respective ones of the second transverse segments.

Any of the antenna discussed above may include a pair of parasitic elements that are positioned on a side of the first radiating element of the antenna. Each of the parasitic elements of the pair may include a first conductive path and a second conductive path that is positioned behind the first conductive path. A resonant frequency of the first parasitic element may differ from a resonant frequency of the second parasitic element so that together the pair of parasitic elements are resonant over a larger portion of the operating frequency band of the first radiating element. In some embodiments, the resonant frequency of the first parasitic element may differ from the resonant frequency of the second parasitic element by at least 5%.

In some embodiments, the two parasitic elements of the pair of parasitic elements may be implemented in a common printed circuit board. In some embodiments, the two parasitic elements of the pair of parasitic elements may be stacked in a forward dimension of the antenna (i.e., stacked in a direction extending forwardly from the plane defined by a reflector of the antenna).

DETAILED DESCRIPTION

Figure 1:
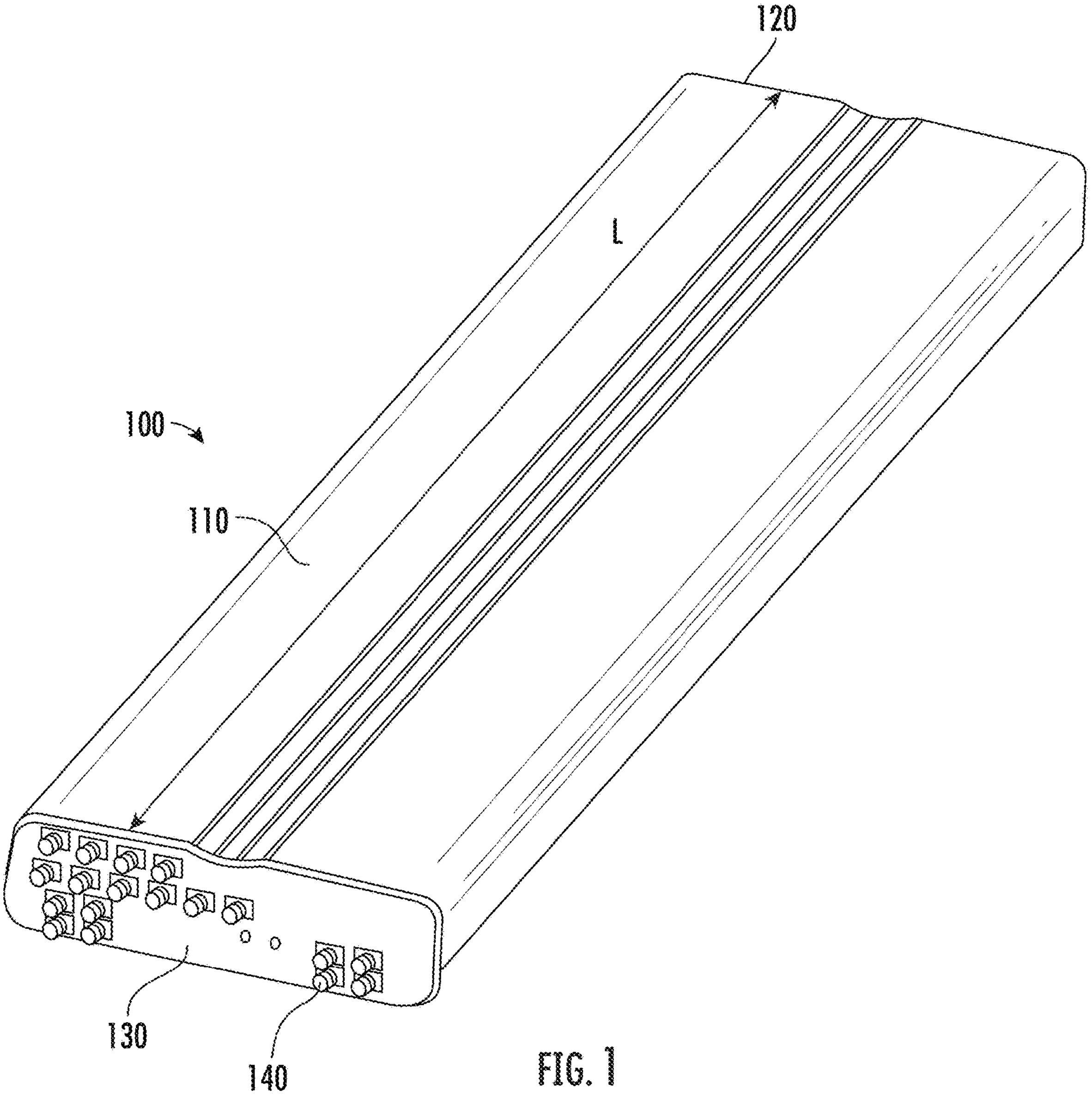
FIG. 1 is a perspective view of a base station antenna according to embodiments of the present invention.

Embodiments of the present invention relate generally to radiating elements for multi-band base station antennas and to related base station antennas. The multi-band base station antennas according to embodiments of the present invention may, for example, support three or more major air-interface standards in three or more cellular frequency bands and allow wireless operators to reduce the number of antennas deployed at base stations, lowering tower leasing costs.

A challenge in the design of multi-band base station antennas is reducing the effect of scattering of the RF signals at one frequency band by the radiating elements of other frequency bands. Scattering is undesirable as it may affect the shape of the antenna beam in both the azimuth and elevation planes, and the effects may vary significantly with frequency, which may make it hard to compensate for these effects. Moreover, at least in the azimuth plane, scattering tends to impact the beamwidth, beam shape, pointing angle, gain and front-to-back ratio in undesirable ways. The radiating elements according to certain embodiments of the present invention may be designed to have reduced impact on the antenna pattern of closely located radiating elements that transmit and receive signals in other frequency bands (i.e., reduced scattering).

Cloaking low-band radiating elements are known in the art. For example, U.S. Pat. No. 9,570,804 discloses a low-band radiating element that operates in the 696-960 MHz frequency band that includes dipole arms that are formed as a series of RF chokes in order to render the low-band radiating element substantially transparent to RF energy in the 1.7-2.7 GHZ frequency band. U.S. Pat. Nos. 10,439,285 and 10,770,803 each disclose low-band radiating elements that operate in the 696-960 MHz frequency band that include dipole arms that are formed as a series of widened segments that are coupled by narrow inductive segments, which may be implemented as small, meandered trace segments on a printed circuit board. In each case, the narrow inductive segments act as high impedance elements for RF energy in the 1.7-2.7 GHz frequency band, rendering the low-band radiating elements substantially transparent to RF energy in that frequency range. As another example, U.S. Pat. No. 11,018,437 discloses a low-band radiating element that operates in the 696-960 MHz frequency band that includes two dipole arms that are substantially transparent to RF energy in the 1.7-2.7 GHz frequency band and another two dipole arms that are substantially transparent to RF energy in the 3.3-4.2 GHz frequency band. Additional cloaking radiating element designs are disclosed in Chinese Patent No. CN 112787061A, Chinese Patent No. CN 112164869A, Chinese Patent No. CN 112290199A, Chinese Patent No. CN 111555030A, Chinese Patent No. CN 112186333A, Chinese Patent No. CN 112186341A, Chinese Patent No. CN 112768895A, Chinese Patent No. CN 112821044A, Chinese Patent No. CN 213304351U, and Chinese Patent No. CN 112421219A.

Pursuant to embodiments of the present invention, multi-band base station antennas are provided that have linear arrays of first, second and third radiating elements that transmit and receive signals in respective first, second and third different frequency bands. In some embodiments, the first frequency band may comprise the 617-960 MHz frequency band or a portion thereof, the second frequency band may comprise the 1427-2690 MHz frequency band or a portion thereof, and the third frequency band may comprise the 3100-4200 MHz frequency band or a portion thereof. Each first radiating element may be a broadband decoupling radiating element that has dipole radiators that are substantially transparent to RF energy in both the second frequency band and in the third frequency band. By providing dipole radiators that are transparent to RF energy in two different frequency bands, it is possible to, for example, closely position the second radiating elements that operate in the second frequency band on one side of the first radiating elements and to closely position the third radiating elements that operate in the third frequency band on the other side of the first radiating elements without the first radiating elements materially impacting the antenna patterns formed by the second and third radiating elements. When the base station antennas according to embodiments of the present invention include arrays of radiating elements that operate in three different frequency bands, the radiating elements that operate in the lowest frequency band may be referred to as "low-band" radiating elements, the radiating elements that operate in the highest frequency band may be referred to as "high-band" radiating elements, and the radiating elements that operate in the intermediate frequency band may be referred to as "mid-band" radiating elements The base station antennas according to some embodiments of the present invention may include low-band radiating elements that are designed to be substantially transparent to RF energy emitted by mid-band and/or high-band radiating elements that are included in the antenna. These low-band radiating elements may include first and second dipole radiators. The dipole radiators may be implemented in a "cross" arrangement to form a pair of center-fed +/−45° dipole radiators, as is well known in the art. Each dipole arm may comprise first and second stacked meandered conductive paths. For example, the dipole arms may be formed on a printed circuit board (or multiple printed circuit boards), with the first meandered conductive path of each dipole arm mounted on a first conductive layer of the printed circuit board and the second meandered conductive path of each dipole arm mounted on a second, different conductive layer of the printed circuit board. Each meandered conductive path may comprise a thin conductive trace that has a length that is much longer than its width, where the conductive trace is a non-linear conductive trace that follows a meandered path to increase the path length thereof. In some embodiments, the total length of each meandered conductive path (i.e., the sum of the length of each segment of the path) may be at least 75% longer than the straight line distance from the base of the meandered conductive path to the distal end of the meandered conductive path. In other embodiments, the total length of each meandered conductive path may be at least twice as long or at least three times as long as the straight line distance from the base of the meandered conductive path to the distal end of the meandered conductive path.

In some embodiments, the first and second meandered conductive paths may each have a wave shape, such as, for example, a general square wave structure. The direction of the effective current flow along each meandered conductive path may be along the longitudinal axis of the meandered conductive path (or longitudinal axes, if the meandered conductive path includes bends that divide the meandered conductive path into multiple sections). In some embodiments, each meandered conductive path may include both longitudinal segments that generally extend in the direction of the effective current flow and transverse segments that generally extend in a direction that is perpendicular to the direction of the effective current flow. At least some of the transverse segments of the first meandered conductive path may "overlap" respective ones of the transverse segments of the second meandered conductive path to form a plurality of pairs of overlapping transverse segments. Herein, first and second segments of respective first and second conductive paths "overlap" if an axis that is perpendicular to a plane defined by the first segment (or a plane defined by the portion of reflector behind the first and second segments if the first segment does not define a single plane) passes through both the first segment and the second segment.

As noted above, these low-band radiating elements may have certain features that allow the dipole arms thereof to pass low-band currents while suppressing the formation of currents in the mid-band and/or high-band frequency ranges in response to radiation emitted by nearby mid-band and/or high-band radiating elements. For example, the widths of the metal traces that form the first and second meandered conductive paths may be selected so that low-band currents can flow relatively freely on the meandered conductive paths while mid-band and/or high-band currents are substantially suppressed. The use of such narrow traces creates an inductive effect that appears as a high impedance to higher frequency RF signals, suppressing current formation by such radiation, while having a sufficiently low impedance for lower frequency RF signals. As another example, the length of each transverse segment (or the average length of the transverse segments) may be selected to be less than a quarter of a wavelength corresponding to the lowest frequency RF signals that are to be suppressed (or, alternatively, to less than a quarter of a wavelength corresponding to the center frequency of the operating frequency band of the mid-band radiating elements). This again facilitates suppression of the mid-band and/or high-band currents without substantially impacting the low-band currents.

As another example, the dipole arms may be designed so that for at least some of the pairs of overlapping transverse segments, the instantaneous direction of a first current formed on the first segment in response to mid-band and/or high-band RF radiation will be substantially opposite the instantaneous direction of a second current formed on the second segment in response to this mid-band/high-band RF radiation. This tends to result in cancellation of any mid-band and/or high-band currents. The dipole arms may be designed so that the same effect is suppressed with respect to low-band currents, allowing the low-band currents to freely flow on the dipole arms.

In one example embodiment of the present invention, an antenna is provided that includes a reflector. First and second radiating elements that are configured to operate in respective first and second operating frequency bands extend forwardly from the reflector. The first radiating element may comprise, for example, a low-band radiating element that is part of an array of low-band radiating elements, and the second radiating element may comprise, for example, a mid-band radiating element that is part of an array of mid-band radiating elements or a high-band radiating element that is part of an array of high-band radiating elements. The first radiating element includes a first dipole radiator having a first dipole arm and a second dipole arm and a second dipole radiator having a third dipole arm and a fourth dipole arm. The first dipole arm includes a first conductive path and a second conductive path that is positioned behind the first conductive path, where the first conductive path includes a plurality of first segments and the second conductive path includes a plurality of second segments. First segments in a subset of the first segments overlap respective ones of second segments in a subset of the second segments to form a plurality of pairs of overlapping first and second segments. At least some of the pairs of overlapping first and second segments are configured so that the instantaneous direction of a first current formed on the first segment in response to RF radiation emitted by the second radiating element will be substantially opposite the instantaneous direction of a second current formed on the second segment in response to the RF radiation emitted by the second radiating element.

In another example embodiment of the present invention, an antenna is provided that includes a reflector and first and second radiating elements that extend forwardly from the reflector and that operate in different frequency bands. The first radiating element includes a first dipole arm that has first and second spaced apart conductive paths, where a first segment of the first conductive path overlaps a second segment of the second conductive path. The first dipole arm is configured so that first and second currents that are induced on the respective first and second conductive paths in response to RF radiation emitted by the second radiating element each flow outwardly along the first dipole arm, but flow in substantially opposite directions along the respective first and second segments.

Pursuant to still further embodiments of the present invention, radiating elements are provided that include a first dipole radiator having a first pair of dipole arms and a second dipole radiator having a second pair of dipole arms. Each dipole arm includes a first meandered conductive path that extends from a base thereof to a distal end thereof and a second meandered conductive path that is positioned behind the first meandered conductive path.

Embodiments of the present invention will now be described in further detail with reference to the attached figures.

Figure 2:
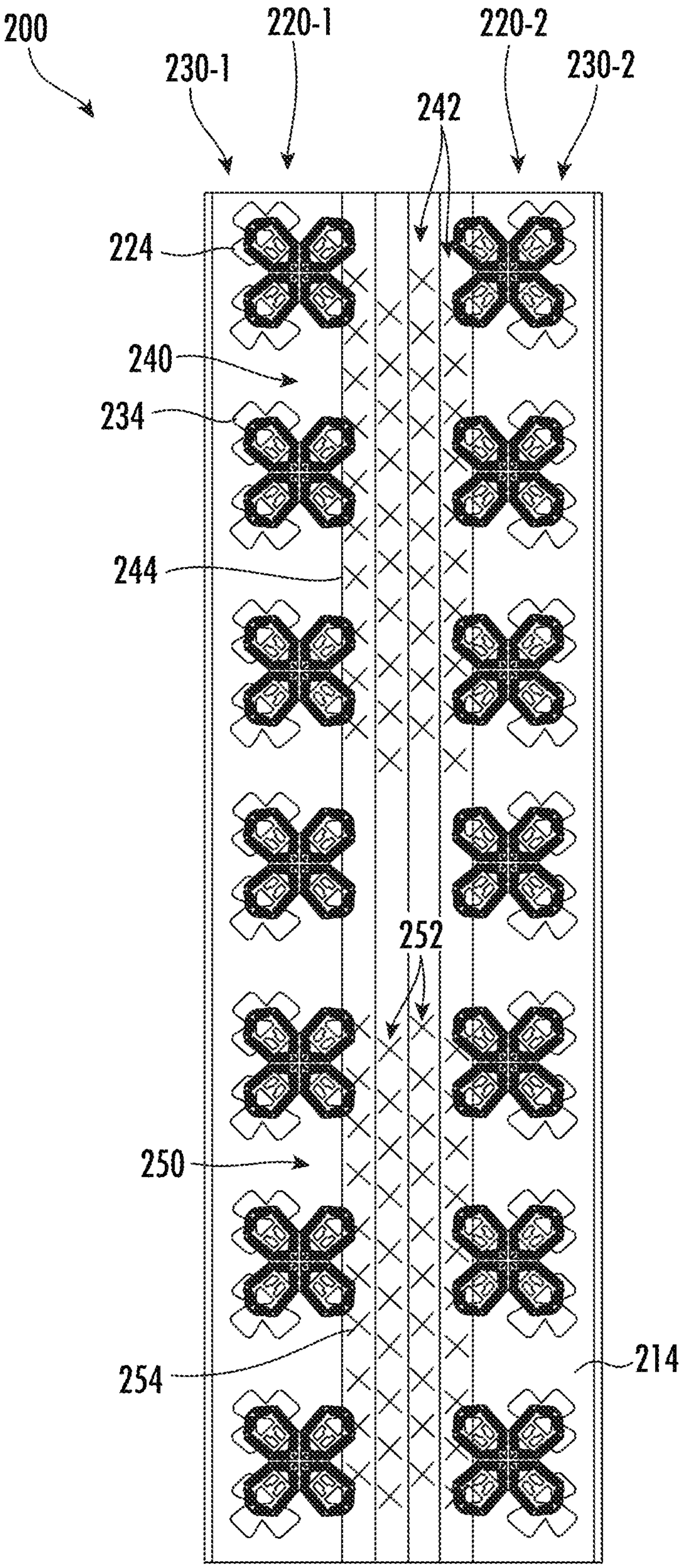
FIG. 2 is a front view of the base station antenna of FIG. 1 with the radome removed.
Figure 3:
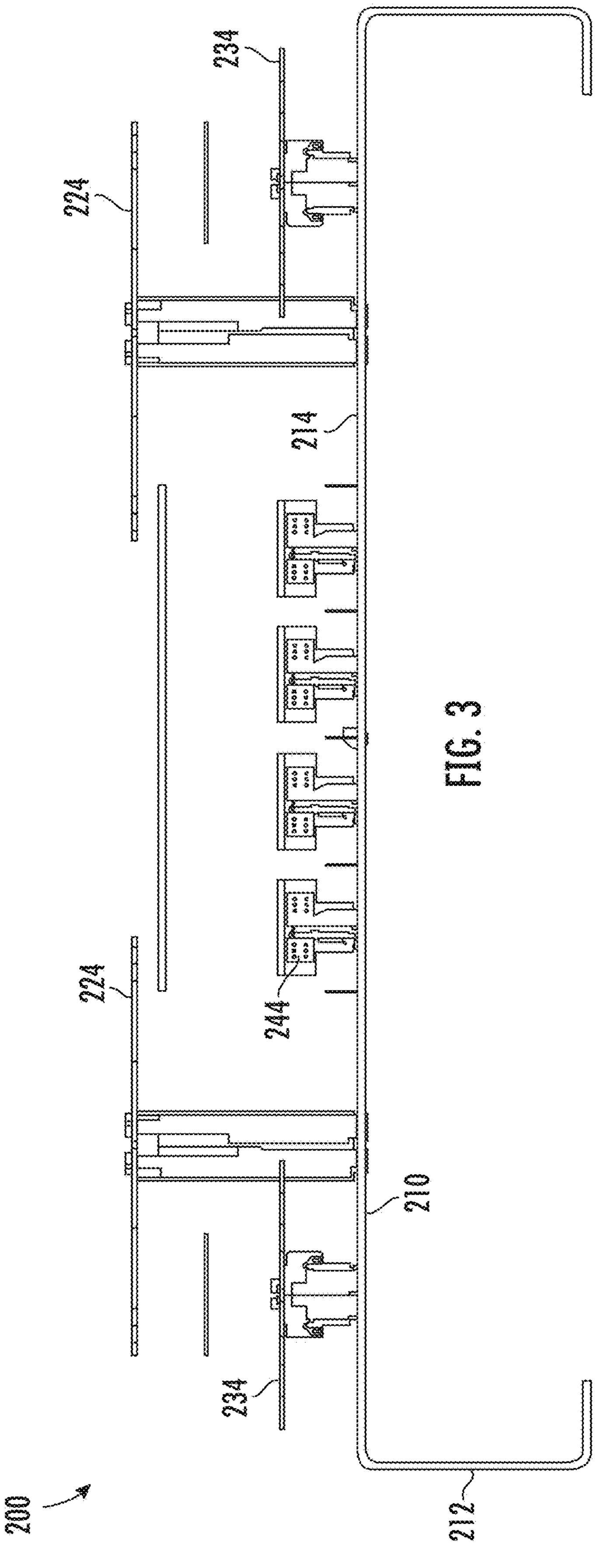
FIG. 3 is a cross-sectional view of the base station antenna of FIG. 1 with the radome removed.

FIGS. 1-3 illustrate a base station antenna 100 according to certain embodiments of the present invention. In particular, FIG. 1 is a perspective view of the antenna 100, while FIGS. 2 and 3 are a front view and a cross-sectional view, respectively, of the antenna 100 with the radome thereof removed to illustrate the antenna assembly 200 of the antenna 100.

In the description that follows, the antenna 100 and the radiating elements included therein will be described using terms that assume that the antenna 100 is mounted for normal use on a tower with a longitudinal axis of the antenna 100 extending along a vertical axis and the front surface of the antenna 100 mounted opposite the tower pointing toward the coverage area for the antenna 100.

As shown in FIGS. 1-3, the base station antenna 100 is an elongated structure that extends along a longitudinal axis L. The base station antenna 100 may have a tubular shape with a generally rectangular cross-section. The antenna 100 includes a radome 110 and a top end cap 120. The antenna 100 also includes a bottom end cap 130 which includes a plurality of connectors 140 such as RF ports mounted therein. The antenna 100 is typically mounted in a vertical configuration (i.e., the longitudinal axis L may be generally perpendicular to a plane defined by the horizon) when the antenna 100 is mounted for normal operation. The radome 110, top cap 120 and bottom cap 130 may form an external housing for the antenna 100. An antenna assembly 200 is contained within the external housing. The antenna assembly 200 may be slidably inserted into the radome 110 from either the top or bottom before the top cap 120 or bottom cap 130 are attached to the radome 110.

FIGS. 2 and 3 are a front view and a cross-sectional view, respectively, of the antenna assembly 200 of base station antenna 100. As shown in FIGS. 2 and 3, the antenna assembly 200 includes a ground plane structure 210 that has sidewalls 212 and a reflector surface 214. Various mechanical and electronic components of the antenna (not shown) may be mounted in a chamber that is defined between the sidewalls 212 and the back side of the reflector surface 214 such as, for example, phase shifters, remote electronic tilt units, mechanical linkages, controllers, diplexers, and the like. The reflector surface 214 of the ground plane structure 210 may comprise or include a metallic surface (e.g., a sheet of aluminium) that serves as a reflector and ground plane for the radiating elements of the antenna 100. Herein the reflector surface 214 may also be referred to as the reflector 214.

A plurality of dual-polarized radiating elements are mounted to extend forwardly from the reflector 214 (the radiating elements extend upwardly from the reflector 214 in the views of FIGS. 2-3, but it will be appreciated that the antenna assembly will be rotated approximately 90° from the orientations shown in FIGS. 2-3 when the antenna 100 is mounted for normal use). The radiating elements include low-band radiating elements 224, mid-band radiating elements 234 and high-band radiating elements 244, 254. The low-band radiating elements 224 are mounted in two columns to form two linear arrays 220-1, 220-2 of low-band radiating elements 224. The mid-band radiating elements 234 may likewise be mounted in two columns to form two linear arrays 230-1, 230-2 of mid-band radiating elements 234. Two planar arrays of high-band radiating elements 244, 254 are included in antenna 100. The first planar array 240 includes four columns 242 of high-band radiating elements 244. The second planar array 250 includes four columns 252 of high-band radiating elements 254. The high-band radiating elements 244 may be the same as or different from the high-band radiating elements 254. All four columns 242 of high-band radiating elements 244 may be coupled to ports of a first beamforming radio (not shown), so that the first planar array 240 may perform active beamforming to generate higher gain antenna beams. All four columns 252 of high-band radiating elements 254 may be coupled to ports of a second beamforming radio (not shown), so that the second planar array 250 may likewise perform active beamforming. It will be appreciated that the number of arrays of low-band, mid-band and/or high-band radiating elements may be varied from what is shown in FIGS. 2 and 3, as may the number of columns and/or radiating elements in each array, and the relative positions of the arrays. It should be noted that herein like elements may be referred to individually by their full reference numeral (e.g., linear array 230-2) and may be referred to collectively by the first part of their reference numeral (e.g., the linear arrays 230).

In the depicted embodiment, the first and second planar arrays 240, 250 of high-band radiating elements 244, 254 are positioned between the linear arrays 220-1, 220-2 of low-band radiating elements 224, and each linear array 220 of low-band radiating elements 224 is positioned between the planar arrays 240, 250 of high-band radiating elements 244, 254 and a respective one of the linear arrays 230 of mid-band radiating elements 234. It will be appreciated that antenna 100 illustrates one typical layout of arrays of low-band, mid-band and high-band radiating elements. Many other array configurations are routinely used based on applications and customer requirements. The radiating elements according to embodiments of the invention may be used in arrays having any suitable configuration.

The low-band radiating elements 224 may be configured to transmit and receive signals in a first frequency band. In some embodiments, the first frequency band may comprise the 617-960 MHz frequency range or a portion thereof (e.g., the 617-896 MHz frequency band, the 696-960 MHz frequency band, etc.). The mid-band radiating elements 234 may be configured to transmit and receive signals in a second frequency band. In some embodiments, the second frequency band may comprise the 1427-2690 MHz frequency range or a portion thereof (e.g., the 1710-2200 MHz frequency band, the 2300-2690 MHz frequency band, etc.). The high-band radiating elements 244, 254 may be configured to transmit and receive signals in a third frequency band. In some embodiments, the third frequency band may comprise the 3300-4200 MHz frequency range or a portion thereof. The low-band linear arrays 220 may or may not be configured to transmit and receive signals in the same portion of the first frequency band. For example, in one embodiment, the low-band radiating elements 224 in the first linear array 220-1 may be configured to transmit and receive signals in the 700 MHz frequency band and the low-band radiating elements 224 in the second linear array 220-2 may be configured to transmit and receive signals in the 800 MHz frequency band. In other embodiments, the low-band radiating elements 224 in both the first and second linear arrays 220-1, 220-2 may be configured to transmit and receive signals in the same frequency band to support the use of multi-input-multi-output ("MIMO") communication techniques. The mid-band and high-band radiating elements 234, 244, 254 in the different mid-band and high-band arrays 230, 240, 250 may similarly have any suitable configuration. The radiating elements 224, 234, 244, 254 may be dual polarized radiating elements, and hence each array 220, 230, 240 250 may be used to form a pair of antenna beams, namely an antenna for each of the two polarizations at which the dual-polarized radiating elements are designed to transmit and receive RF signals.

While not shown in the figures, the radiating elements 224, 234, 244, 254 may be mounted on feed boards that couple RF signals to and from the individual radiating elements 224, 234, 244, 254. One or more radiating elements 224, 234, 244, 254 may be mounted on each feed board. Cables may be used to connect each feed board to other components of the antenna such as diplexers, phase shifters or the like.

While cellular network operators are interested in deploying antennas that have a large number of arrays of radiating elements in order to reduce the number of base station antennas required per base station, increasing the number of arrays typically increases the width of the antenna. Both the weight and wind loading of a base station antenna increase with increasing width, and thus wider base station antennas tend to require structurally more robust antenna mounts and antenna towers, both of which can significantly increase the cost of a base station. Accordingly, cellular network operators may place limitations on the widths of base station antennas (where the limits may depend on the application for the antenna). For example, for many applications, cellular network operators may require that the width of a base station antenna be below 500 mm. This can be challenging in base station antennas that include two linear arrays of low-band radiating elements, since most conventional low-band radiating elements that are designed to serve a 120° sector have a width of about 200 mm or more.

The width of a multi-band base station antenna may be reduced by decreasing the separation between adjacent arrays. However, as the separation is reduced, increased coupling between the radiating elements of the different arrays occurs, and this increased coupling may impact the shapes of the antenna beams generated by the arrays in undesirable ways. For example, a low-band cross-dipole radiating element will typically have dipole radiators that have a length that is approximately ½ a wavelength of the center frequency of the designed operating frequency band for the radiating element. If the low-band radiating element is designed to operate in the 700 MHz frequency band, and the mid-band radiating elements are designed to operate in the 1400 MHz frequency band, the length of the low-band dipole radiators will be approximately one wavelength at the mid-band operating frequency. As a result, each dipole arm of a low-band dipole radiator will have a length that is approximately ½ a wavelength at the mid-band operating frequency, and hence RF energy transmitted by the mid-band radiating elements will tend to couple to the low-band radiating elements since such RF energy will be resonant in a ½ wavelength dipole arm.

When mid-band and/or high-band RF energy couples to the dipole arms of a low-band radiating element, mid-band and/or high-band currents are induced on the dipole arms. Such induced currents are particularly likely to occur when the low-band and mid-band radiating elements are designed to operate in frequency bands having center frequencies that are separated by about a factor of two (or four), since a low-band dipole arm having a length that is a quarter wavelength of the low-band operating frequency will, in that case, have a length of approximately a half wavelength (or a full wavelength) of the higher band operating frequency. The induced currents generate mid-band and/or high-band RF radiation that is emitted from the low-band dipole arms. The mid-band/high-band RF energy emitted from the dipole arms of the low-band resonating element distorts the antenna beam of the mid-band and/or high-band arrays since the radiation is being emitted from a different location than intended. The greater the extent that mid-band/high-band currents are induced on the low-band dipole arms, the greater the impact on the characteristics of the antenna beams generated by the mid-band and high-band arrays.

The low-band radiating elements 224 according to embodiments of the present invention may be designed to be substantially transparent to RF energy emitted by the mid-band and high-band radiating elements 234, 244, 254. As such, even if the mid-band and high-band radiating elements 234, 244, 254 are in close proximity to the low-band radiating elements 224, the above-discussed undesired coupling of mid-band and/or high-band RF energy onto the low-band radiating elements 224 may be significantly reduced.

Figure 4A:
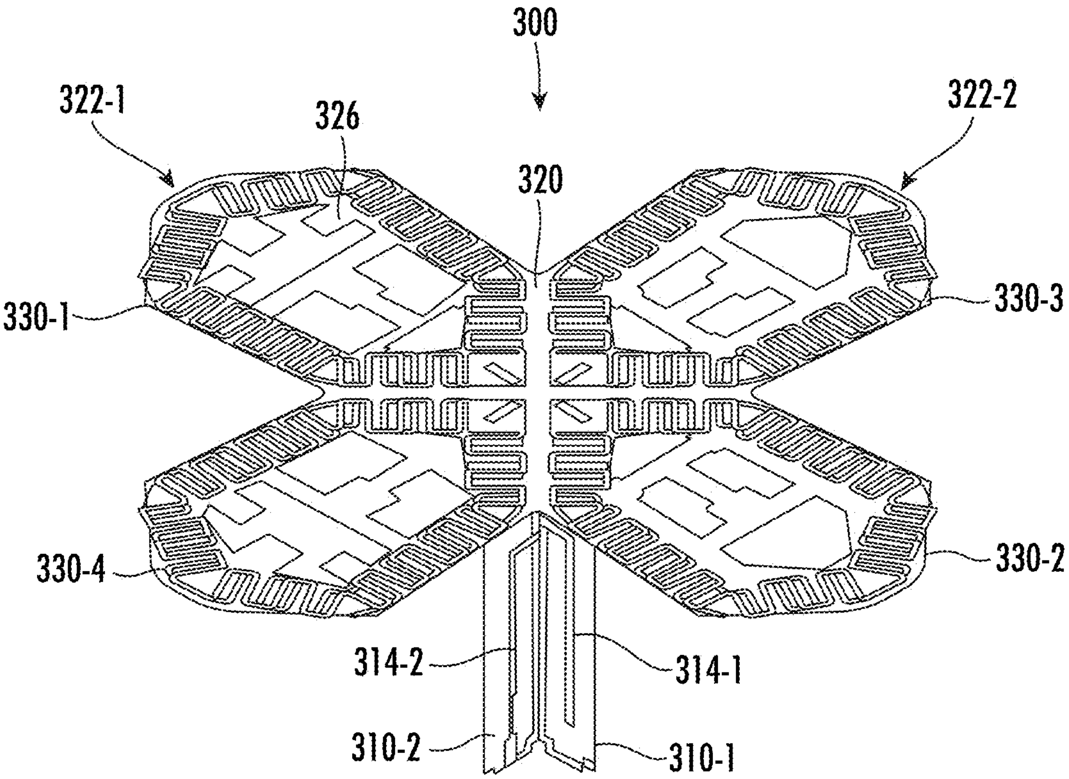
FIG. 4A is an enlarged perspective view of one of the low-band radiating elements of the base station antenna of FIGS. 1-3.
Figure 4B:
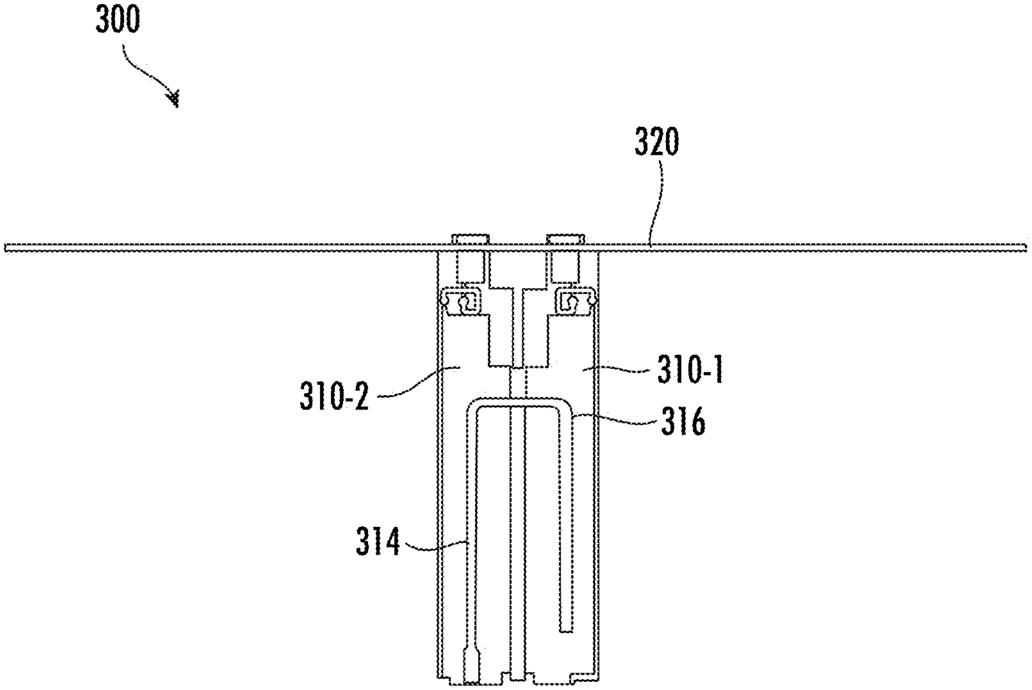
FIG. 4B is a side view of the low-band radiating element of FIG. 4A.
Figure 4C:
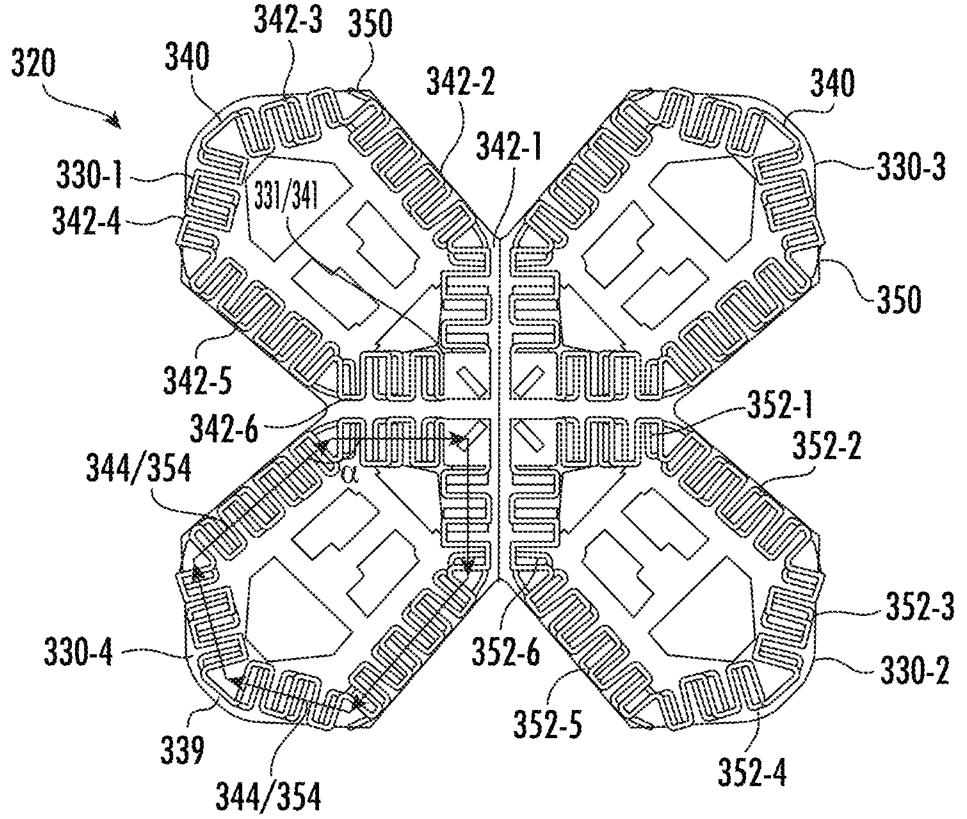
FIG. 4C is a plan view of the dipole radiator printed circuit board of the low-band radiating element of FIG. 4A.
Figure 4D:
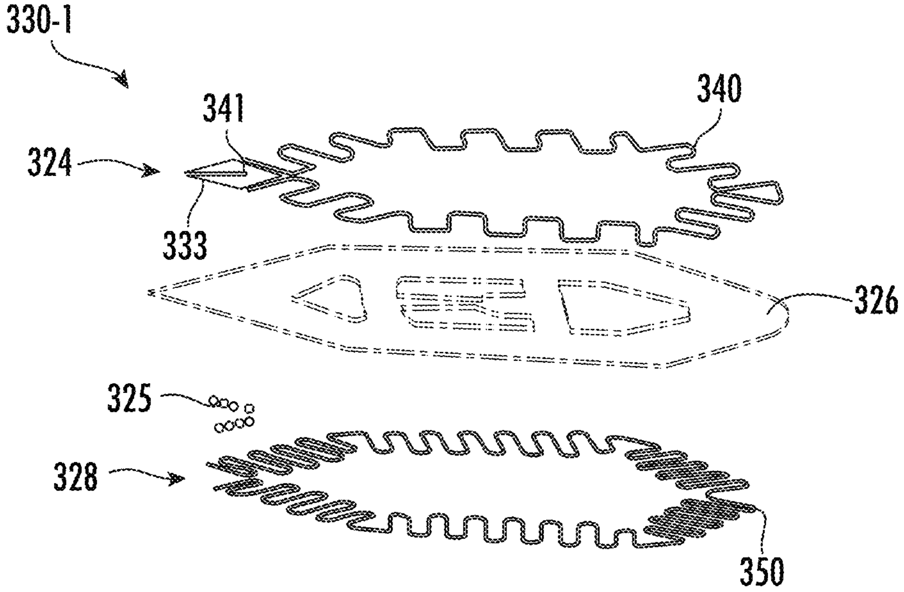
FIG. 4D is an exploded perspective view of one of the dipole arms included on the dipole radiator printed circuit board of FIG. 4C.
Figure 4E:
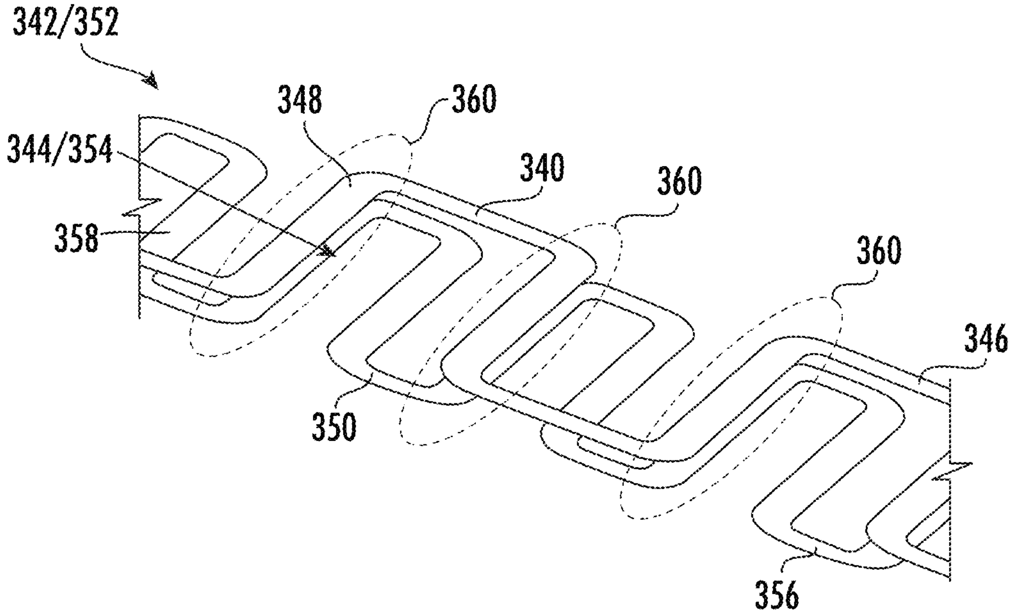
FIG. 4E is an enlarged perspective view of portions of first and second conductive meander lines that are included on each dipole arm of the low-band radiating element of FIG. 4A.
Figure 4F:
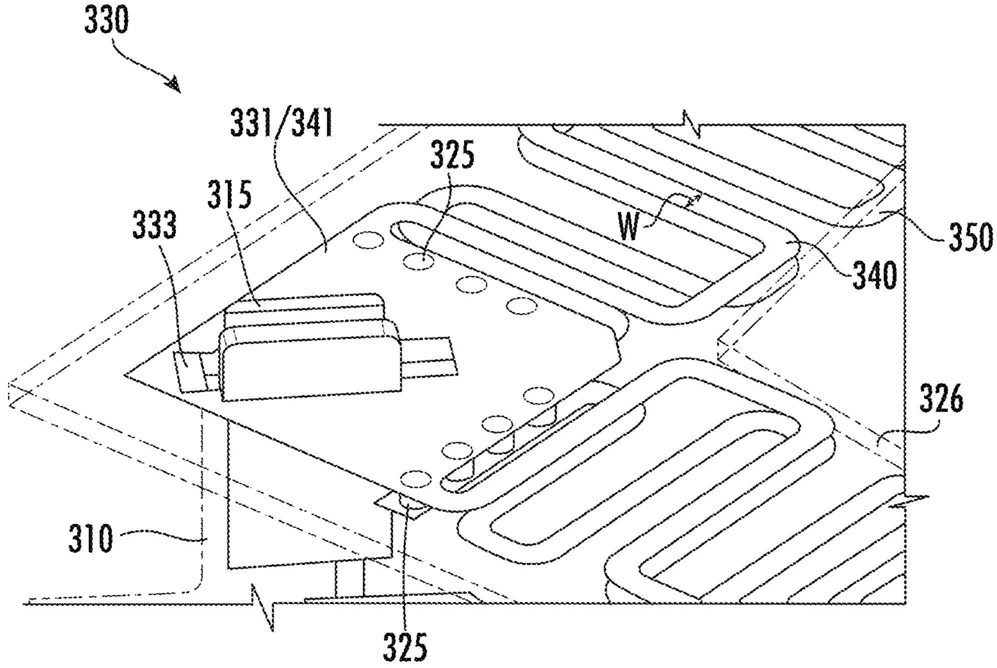
FIG. 4F is an enlarged perspective view of the connection between one of the feed stalks and the base of one of the dipole arms of the low-band radiating element of FIG. 4A.

FIGS. 4A-4F illustrate a low-band radiating element 300 according to embodiments of the present invention that may be used to implement the low-band radiating elements 224 of base station antenna 100. In particular, FIGS. 4A and 4B are an enlarged perspective view and a side view, respectively, of the low-band radiating element 300. FIG. 4C is a plan view of a dipole radiator printed circuit board 320 that is part of the low-band radiating element 300. FIG. 4D is an exploded perspective view of one of the dipole arms of low-band radiating element 300. FIG. 4E is an enlarged perspective view of portions of first and second conductive meander lines that are included on each dipole arm of the low-band radiating element of 300. FIG. 4F is an enlarged perspective view of the connection between one of the feed stalks and the base of one of the dipole arms of the low-band radiating element 300.

Referring to FIGS. 4A-4C, the low-band radiating element 300 includes a pair of feed stalks 310, and a dipole radiator printed circuit board 320. First and second dipole radiators 322-1, 322-2 are formed on the dipole radiator printed circuit board 320. The first dipole radiator 322-1 includes first and second dipole arms 330-1, 330-2, and the second dipole radiator 322-2 includes third and fourth dipole arms 330-3, 330-4. The dipole radiators 322-1, 322-2 may be implemented in a "cross" arrangement to form a pair of center-fed +/−45° dipole radiators 322.

The feed stalks 310 may each comprise a printed circuit board 312 that has RF transmission lines 314 formed thereon. These RF transmission lines 314 carry RF signals between a feed board (not shown) that is mounted on the reflector 214 and the dipole radiators 322. Each feed stalk 310 may further include a hook balun 316. A first of the feed stalks 310-1 may include a front slit and the second of the feed stalks 310-2 includes a back slit. These slits allow the two feed stalks 310 to be assembled together to form a forwardly extending column that has generally x-shaped vertical cross-sections. Rear portions of each feed stalk 310 may include projections that are inserted through slits in the feed board (not shown) to mount the radiating element 300 thereon. The RF transmission lines 314 on the respective feed stalks 310 may center feed the dipole radiators 322-1, 322-2.

The azimuth half power beamwidths of each low-band radiating element 300 may be in the range of 55 degrees to 85 degrees. In some embodiments, the azimuth half power beamwidth of each low-band radiating element 300 may be approximately 65 degrees in the center of the operating frequency band for the low-band radiating element 300.

Each dipole arm 330 may be between approximately 0.2 to 0.35 of an operating wavelength in length, where the "operating wavelength" refers to the wavelength corresponding to a center frequency of the operating frequency band of the radiating element 300. For example, if the low-band radiating elements 300 are designed to transmit and receive signals across the 694-960 MHz frequency band, then the center frequency of the operating frequency band would be 827 MHz and the corresponding operating wavelength would be 36.25 cm.

The dipole radiator printed circuit board 320 includes a dielectric substrate 326 that has a first conductive layer 324 formed on a front side thereof and a second conductive layer 328 formed on a rear side thereof as is best shown in FIG. 4D. The conductive layers 324, 328 may comprise patterned copper layers in example embodiments, and may be referred to herein as "metal layers." The dipole radiator printed circuit board 320 may also include protective dielectric coatings (not shown) on the front and/or rear sides of the dielectric substrate 326 that cover and protect the first and second metal layers 324, 328. The metal patterns in metal layers 324, 328 form the dipole arms 330. The first metal layer 324 may define a first plane and the second metal layer 328 may define a second plane that is parallel to and spaced apart from the first plane. Both the first plane and the second plane may be generally parallel to a plane defined by the reflector 214 in some embodiments. Each feed stalk 310 may extend in a direction that is generally perpendicular to the first and second planes.

As shown best in FIG. 4C, the first dipole radiator 322-1 extends along a first axis and the second dipole radiator 322-2 extends along a second axis that is generally perpendicular to the first axis 322-1. Consequently, the first and second dipole radiators 322-1, 322-2 are arranged in the general shape of a cross. Dipole arms 330-1 and 330-2 of first dipole radiator 322-1 are center fed by a first RF transmission line 314-1 and radiate together at a first polarization (see FIG. 4A). In the depicted embodiment, the first dipole radiator 322-1 is designed to transmit signals having a −45° polarization. Dipole arms 330-3 and 330-4 of second dipole radiator 322-2 are center fed by a second RF transmission line 314-2 and radiate together at a second polarization that is orthogonal to the first polarization. The second dipole radiator 322-2 is designed to transmit signals having a +45° polarization. The dipole arms 330 may be mounted approximately 3⁄16 to ¼ an operating wavelength forwardly of the reflector 214 by the feed stalks 310.

Referring again to FIGS. 2 and 3, it can be seen that the low-band radiating elements 224 (300) extend farther forwardly from the reflector 214 than do both the mid-band radiating elements 234 and the high-band radiating elements 244, 254. In order to keep the width of the base station antenna 100 relatively narrow, the low-band radiating elements 224 (300) may be located in very close proximity to both the mid-band radiating elements 234 and the high-band radiating elements 244, 254. In the depicted embodiment, each low-band radiating element 224 (300) that is adjacent a linear array 230 of mid-band radiating elements 234 may overlap a substantial portion of two of the mid-band radiating elements 234. Likewise, each low-band radiating element 224 (300) that is adjacent an array 240, 250 of high-band radiating elements 244, 254 may overlap at least a portion of one or more of the high-band radiating elements 244, 254. This arrangement allows for a significant reduction in the width of the base station antenna 100. As discussed above, herein, first and second segments of respective first and second conductive paths "overlap" if an axis that is perpendicular to a plane defined by the first segment (or a plane defined by the portion of reflector behind the first and second segments) passes through both the first segment and the second segment.

While positioning the low-band radiating elements 224 (300) so that they overlap the mid-band and/or the high-band radiating elements 234, 244, 254 may advantageously facilitate reducing the width of the base station antenna 100, this approach may significantly increase the coupling of RF energy transmitted by the mid-band and/or the high-band radiating elements 234, 244, 254 onto the low-band radiating elements 224 (300), and such coupling may degrade the antenna beams formed by the arrays 230, 240, 250 of mid-band and/or high-band radiating elements 234, 244, 254.

In order to reduce such coupling, the low-band radiating elements 300 may be designed to have dipole arms 330 that are substantially "transparent" to radiation emitted by both the mid-band radiating elements 234 and the high-band radiating elements 244, 254. This may be challenging, as the mid-band radiating elements 234 may operate (in some cases) at frequencies as low as 1427 MHz and the high-band radiating elements 244, 254 may operate (in some cases) at frequencies as high as 4200 MHz. Thus, ideally the low-band radiating elements 300 are substantially transparent to RF energy in the 1427-4200 MHz frequency range, while allowing currents in the 617-960 MHz frequency range to flow freely on the dipole arms 330. Herein, a dipole arm of a radiating element that is configured to transmit RF energy in a first frequency band is considered to be "transparent" to RF energy in a second, different frequency band RF energy if the RF energy in the second frequency band poorly couples to the dipole arm. Accordingly, if a dipole arm of a first radiating element that is transparent to a second frequency band is positioned so that it overlaps a second radiating element that transmits in the second frequency band, the addition of the first radiating element will not materially impact the antenna pattern of the second radiating element.

Referring to FIGS. 4C and 4D, each dipole arm 330 includes a first conductive path 340 that is implemented in the first metal layer 324 of the dipole radiator printed circuit board 320 and a second conductive path 350 that is implemented in the second metal layer 328 of the dipole radiator printed circuit board 320. The second conductive path 350 is positioned behind the first conductive path 340. The first and second conductive paths 340, 350 may each comprise a respective meandered conductive path. Herein, a meandered conductive path refers to a non-linear conductive path that follows a wandering path to increase the path length thereof. The conductive path may comprise a thin conductive trace that has a length that is much longer than its width. Using meandered conductive path allows the length of the path to be substantially increased while still providing relatively compact first and second conductive paths 340, 350. Examples of meandered conductive paths are conductive paths that have the general form of a square wave or a sine wave, although embodiments of the present invention are not limited thereto. It will also be appreciated that if a meandered conductive path is formed to have a wave shape (e.g., square wave), the magnitude and/or the frequency of the wave need not be constant.

As shown in FIGS. 4C-4D, in example embodiments, the first and second conductive paths 340, 350 may each have the general form of a square wave that is "bent" into a closed loop shape so that each dipole arm 330 has a generally oval shape. To form the closed loop shape, each meandered conductive path 340, 350 is divided into a plurality of sections 342, 352 where the meandered conductive paths 340, 350 extend along respective longitudinal axes 344, 354, and the sections 342, 352 (and hence the longitudinal axes 344, 354) are angled with respect to each other. The longitudinal axes 344, 354 are illustrated in FIG. 4C with respect to dipole arm 330-4. Since each section 342 of meandered conductive paths 340 extends in the same direction as a corresponding section 352 of meandered conductive path 350, the axes 344 and 354 are the same axes in plan view, and hence shown as a single axis 344/354 in FIG. 4C. For example, a first section 342-1 of the first meandered conductive path 340 is interposed between a base 331 of dipole arm 330-1 and a second section 342-2 of the first meandered conductive path 340, and a first section 352-1 of the second meandered conductive path 350 is interposed between the base 331 of dipole arm 330-1 and a second section 352-2 of the second meandered conductive path 350. The first sections 342-1, 352-1 are angled with respect to the respective second sections 342-2, 352-2 by a first angle α. In the depicted embodiment, each meandered conductive paths 340, 350 includes a total of six sections 342-1 through 342-6. The base 331 of each dipole arm 330 (as well as the base of the conductive paths 340, 350 that form the dipole arm 330) is adjacent the center of the radiating element 300. The distal end 339 of each dipole arm 330 is the outermost portion of the respective dipole arm 330. As shown, the third and fourth sections 342-3, 342-4 of the dipole arm 330-1 may connect to each other at the distal end 339 of the dipole arm 330-1 so that the dipole arm 330 may comprise a pair of closed loop structures. In other embodiments, the third and fourth sections 342-3, 342-4 of the dipole arm 330-1 may not connect to each other. The direction of the effective current flow for low-band currents along each meandered conductive path 340, 350 may be along the longitudinal axes 344, 354 of each section 342, 352 of the meandered conductive path 340, 350.

FIG. 4E is an enlarged view of a portion of respective sections 342, 352 of the first and second meandered conductive paths 340, 350. As can be seen, the first meandered conductive path 340 includes a plurality of first longitudinal segments 346 that extend generally parallel to the longitudinal axis 344 of the section 342, as well as a plurality of first transverse segments 348 that extend generally perpendicular to the longitudinal axis 344 of the section 342. Likewise, the second meandered conductive path 350 includes a plurality of second longitudinal segments 356 that extend generally parallel to the longitudinal axis 354 of the section 352, as well as a plurality of second transverse segments 358 that extend generally perpendicular to the longitudinal axis 354 of the section 352. On each conductive path 340, 350, the longitudinal segments 346 and the transverse segments 348 alternate to form the square wave.

As can be seen from FIG. 4E, at least some of the first transverse segments 348 overlap respective ones of the second transverse segments 358 to form a plurality of pairs 360 of overlapping first and second transverse segments 348, 358. As noted above, first and second segments of a conductive path (e.g., first and second transverse segments 348, 358) "overlap" if an axis that is perpendicular to a plane defined by the first segment passes through both the first segment and the second segment. In the depicted embodiment, a frequency of the square wave defined by the second meandered conductive path 350 is twice the frequency of the square wave defined by the first meandered conductive path 340. Consequently, each first transverse segment 348 of the first meandered conductive path 340 overlaps a corresponding second transverse segment 358 of the second meandered conductive path 350, but only half the second transverse segments 358 have a corresponding overlapping first transverse conductive segment 348.

The pairs 360 of overlapping first and second transverse segments 348, 358 may be configured to help suppress currents from forming on the first and second meandered conductive paths 340, 350 in response to RF radiation emitted by either the mid-band radiating elements 234 or the high-band radiating elements 244, 254 that may be positioned near the low-band radiating element 300. In particular, each pair 360 of overlapping first and second transverse segments 348, 358 may be configured so that the instantaneous direction of a first current formed on the first transverse segment 348 of the pair 360 in response to RF radiation emitted by the mid-band or high-band radiating elements 234, 244, 254 will be substantially opposite the instantaneous direction of a second current formed on the second transverse segment 358 of the pair 360 in response to the mid-band or high-band RF radiation. As such, the first and second currents "flowing" on the first and second transverse segments 348, 358 of each pair 360 of overlapping first and second transverse segments 348, 358 will tend to cancel each other out, suppressing the formation of currents on the low-band dipole arm 330 in response to RF radiation emitted by the nearby mid-band or high-band radiating elements 234, 244, 254.

The low-band radiating element 300 may have certain features that allow the dipole arms 330 thereof to pass low-band currents while suppressing the formation of currents in the mid-band and/or high-band frequency ranges in response to radiation emitted by nearby mid-band and/or high-band radiating elements 234, 244, 254. For example, the widths w (see FIG. 4E) of the metal traces that form the meandered conductive paths 340, 350 may be selected so that low-band currents can flow relatively freely on the meandered conductive paths 340, 350, while mid-band and/or high-band currents are substantially suppressed. In some embodiments, the width w of each meandered conductive path 340, 350 may be selected, for example, to be smaller than 0.05 of a wavelength corresponding to the lowest frequency RF signals that are to be suppressed. The use of conductive traces with narrow widths creates an inductive effect that appears as a high impedance to higher frequency RF signals, suppressing current formation by such radiation, while having a sufficiently low impedance for lower frequency RF signals (allowing currents generated by such lower frequency RF signals to flow on the dipole arms 330). In effect, the meandered conductive paths 340, 350 form an inductive-capacitive (LC) resonant circuit. By selecting an appropriate width for the traces forming the meandered conductive paths 340, 350, the LC circuit may appear as an open circuit at a resonant frequency thereof, which may be at the mid-band/high-band frequencies. Thus, the dipole arms 330 may tend to allow low-band currents to flow thereon while suppressing formation of mid-band and high-band currents. The suppression will tend to increase with increasing frequency.

As another example, the "length" of each transverse segment 348, 358 (i.e., the distance the transverse segments 348, 358 extend along their longitudinal axis) or, alternatively, the average length of all of the transverse segments on a given conductive path, may be selected to be less than one quarter of a wavelength corresponding to the lowest frequency RF signals that are to be suppressed. Thus, for example, the length of each transverse segment 348, 358 (or the average lengths of the transverse segments 348, 358 on each conductive path 340, 350) may be selected in example embodiments to be less than one-quarter of a wavelength corresponding to a frequency of 1427 MHz or a frequency of 1690 MHz (example lowest frequencies of the operating frequency band of the mid-band radiating elements 234). In other embodiments, an average length of the transverse segments 348 on the first meandered conductive path 340 as well as an average length of the transverse segments 358 on the second meandered conductive path 350 may each be less than ¼ of a wavelength corresponding to the center frequency of the operating frequency band of the mid-band radiating elements 234.

As another example, the dipole arms 330 may be designed so that for at least some of the pairs of overlapping transverse segments 360 the direction of instantaneous current flow on the transverse segments 348 of the first meandered conductive path 340 is generally opposite the direction of instantaneous current flow on the transverse segments 358 of second meandered conductive path 350. This tends to result in cancellation of any mid-band and/or high-band currents, but has only a very limited cancellation effect for low-band currents. This can best be seen with reference to FIGS. 5A-5B, which are perspective views of a small portion of the first and second meandered conductive paths 340, 350 of dipole arm 330-1 that illustrate the direction of instantaneous of current flow on the respective conductive paths for mid-band currents induced on the dipole arm 330-1 in response to RF radiating emitted by a nearby mid-band radiating element 234 (FIG. 5A) and for the direction of instantaneous current flow for low-band currents that are fed to the dipole arm 330-1 (FIG. 5B).

Figure 5A:
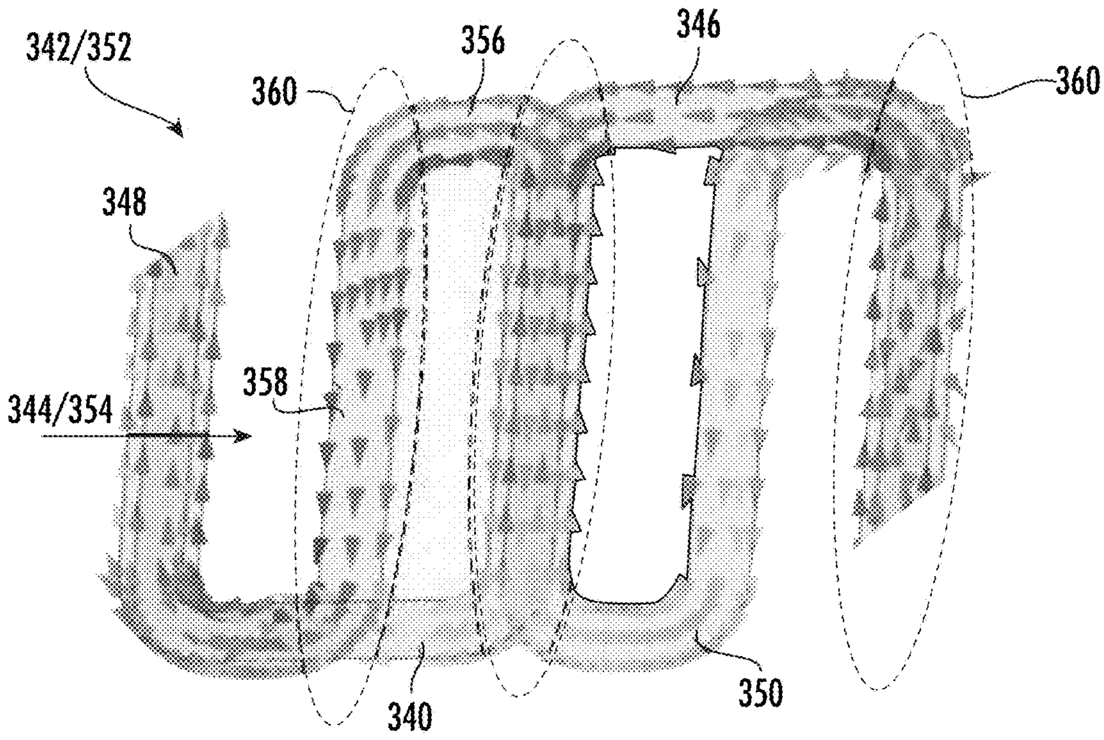
FIG. 5A is a perspective view of a small portion of the first and second conductive paths of the low-band radiating element of FIGS. 4A-4F that illustrates the direction of current flow on the respective conductive paths in response to radiation emitted by a nearby mid-band radiating element.

As shown in FIG. 5A, with respect to the induced mid-band currents, the general direction of the current flow on the first meandered conductive path 340 is from the right to the left, or in the direction of the longitudinal axis 344 of the depicted section 342 of the first meandered conductive path 340. Likewise, the general direction of the current flow on the second meandered conductive path 350 is from the right to the left, or in the direction of the longitudinal axis 354 of the depicted section 352 of the second meandered conductive path 350. Consequently, the current flow on the longitudinal sections 346, 356 of the respective first and second meandered conductive paths 340, 350 is generally parallel to the respective longitudinal axes 344, 354. The transverse conductive segments 348, 358 are configured so that the current flow on each transverse segment 348, 358 alternates from the top to the bottom and from the bottom to the top of the transverse segments 348, 358. Because the frequency of the square wave of the second meandered conductive path 350 is twice the frequency of the square wave of the first meandered conductive path 340, for each pair 360 of overlapping first and second transverse segments 348, 358, the direction of instantaneous current flow on each second transverse segment 358 may be generally opposite the direction of instantaneous current flow on the first transverse segment 348 of each pair 360. As discussed above, this results in the mid-band and/or high-band currents tending to cancel each other out, thereby suppressing mid-band and high-band current flows on the dipole arms 330.

Figure 5B:
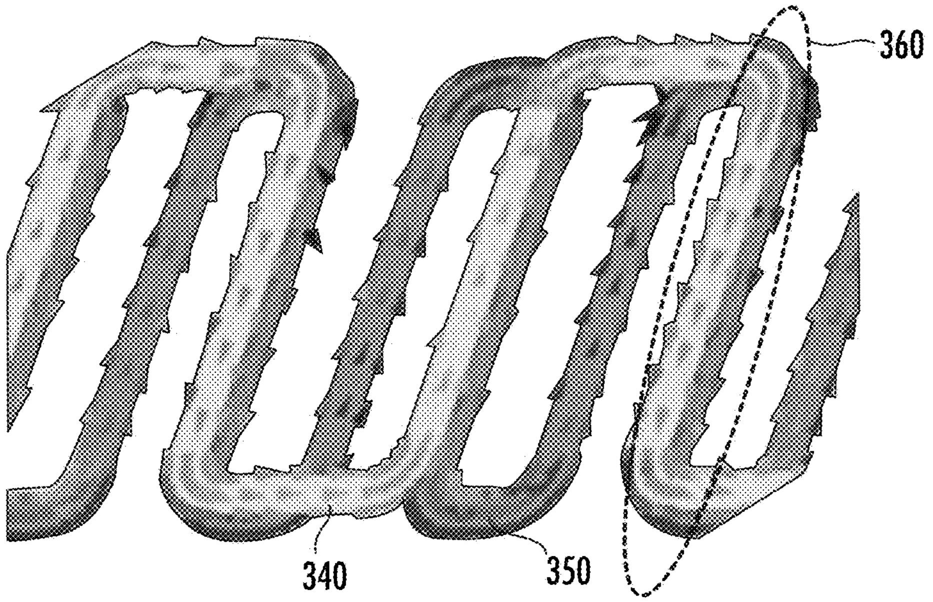
FIG. 5B is a perspective view of a small portion of the first and second conductive paths of the low-band radiating element of FIGS. 4A-4F that illustrates the direction of low-band current flow on the respective conductive paths.

As shown in FIG. 5B, the low-band currents that form on dipole arm 330 when the radiating element 300 is driven (i.e., fed a low-band RF signal) tend to flow outwardly along the dipole arm 330. In the example embodiment shown the low-band currents flowing on every other pair 360 of overlapping first and second transverse segments 348, 358 may have generally the same instantaneous current direction, and hence no cancellation occurs. As can also be seen from FIG. 5B, the low-band currents flowing on the remaining pairs 360 of overlapping first and second transverse segments 348, 358 may have generally the opposite instantaneous current direction. However, even this results in at most limited current cancellation for the low-band currents because, for the low-band currents, the transverse segments 348, 358 on average have an orientation that is perpendicular to the polarization direction of the dipole arm (which is a direction of −45° for dipole arm 330-1). Moreover, when the transverse segments are positioned so that the average current flow thereon is perpendicular to the polarization direction of the dipole arm, then the opposite current flow tends to not result in the above-described cancellation. With respect to the low-band currents, which are generated in response to a feed signal being supplied to the dipole arm, the currents flow outwardly on the dipole arm such that on average the current flow on the transverse segments is perpendicular to the polarization direction of the dipole arm. As such, the design of the transverse segments 348, 358 on dipole arm 330 may tend to have little impact on the low-band currents while suppressing mid-band and high-band currents.

FIG. 4F is an enlarged perspective view of the connection between one of the feed stalks 310 and the base 331 of dipole arm 330-1 of low-band radiating element 300. As can be seen in FIG. 4F, the base end of the first meandered conductive path 340 may comprise a generally rectangular metal pad 341 that is formed in the first metal layer 324 of printed circuit board 320. A rectangular slit 333 is cut through the dipole radiator printed circuit board 320 within the generally rectangular metal pad 341. A tab 315 on the feed stalk 310 is inserted through the rectangular slit 333. The transmission line 314 on the feed stalk 310 extends to the forward end of the feed stalk 310 so that the transmission line 314 extends through the rectangular slit 333. One or more solder joints are formed on the front and/or rear surfaces of the base of dipole arm 330-1 that electrically connect the transmission line 314 on the feed stalk 310 to the generally rectangular metal pad 341 that forms the base of the first meandered conductive path 340. The one or more solder joints may also facilitate mechanically mounting the dipole radiator printed circuit board 320 on the feed stalk 310.

As can further be seen in FIGS. 4E-4F, a plurality of conductive through holes 325 are formed through the dielectric substrate 326 of the dipole radiator printed circuit board 320. The conductive through holes 325 may comprise metal-plated and/or metal filled through holes. The generally rectangular metal pad 341 overlaps and hence is electrically connected to the conductive through holes 325. Likewise, the first of the second transverse segments 358 of the first section 352-1 (and the first of the second transverse segments 358 of the first section 352-6) overlap and hence are electrically connected to the conductive through holes 325. Thus, both the first meandered conductive path 340 and the second meandered conductive path 350 are galvanically connected to the feed line 314 on feed stalk 310.

FIGS. 6-9 are perspective views of a small portion of first and second conductive meandered conductive paths that are included on the dipole arms of low-band radiating elements according to further embodiments of the present invention. While only a small portion of one dipole arm is illustrated in FIGS. 6-9, it will be appreciated that the design of the meandered conductive paths shown in FIGS. 6-9 may be used in each of the dipole arms of radiating element 330 in place of the meandered conductive paths 340, 350 to provide additional low-band radiating elements according to embodiments of the present invention.

Figure 6:
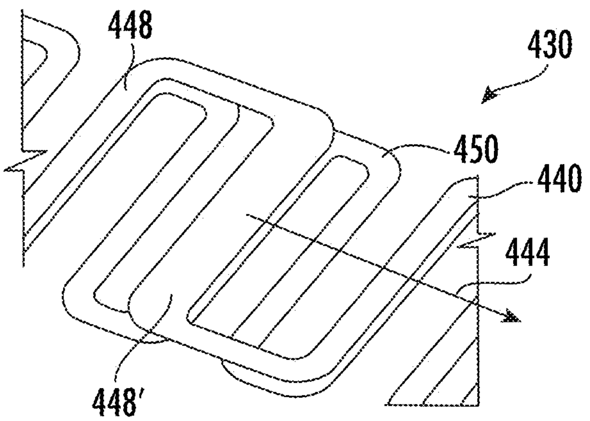
FIGS. 6-9 are perspective views of a small portion of first and second conductive meander lines that are included on the dipole arms of low-band radiating elements according to further embodiments of the present invention.

Referring to FIG. 6, a dipole arm 430 according to further embodiments of the present invention includes a first meandered conductive path 440 that is spaced apart from a second meandered conductive path 450 in the manner discussed above with respect to dipole arm 330. The first meandered conductive path 440 is very similar to the first meandered conductive path 340 that is described above, but at least some of the transverse segments 448 of the first meandered conductive path 440 are widened transverse segments 448' (i.e., they extend further along the longitudinal axis 444 of the illustrated section of dipole arm 430). This may advantageously increase the coupling between the current flowing in a first direction on the first meandered conductive path 440 and the current flowing in a second, opposite direction on the second meandered conductive path 450, thereby resulting in increased cancellation. As all other aspects of dipole arm 440 may be identical to the dipole arms 330 described above, further description of the dipole arm 430 or the operation thereof will be omitted.

Figure 7:
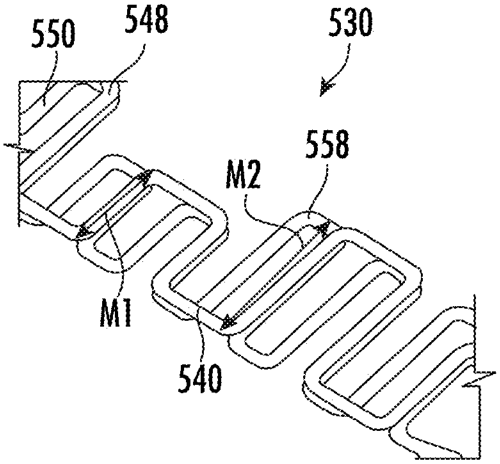

Referring to FIG. 7, a dipole arm 530 according to further embodiments of the present invention includes a first meandered conductive path 540 that is spaced apart from a second meandered conductive path 550. The first and second meandered conductive paths 540, 550 are similar to the respective first and second meandered conductive paths 340, 350 that are described above, but the "magnitude" of the square wave formed by each meandered conductive paths 540, 550 is not constant, and instead varies. In the depicted embodiment, first portions of the square wave have a magnitude of M1 while other portions have a magnitude M2, where the magnitude corresponds to the length of the transverse segments 548, 558 of the first and second meandered conductive paths 540, 550. While in FIG. 7 the magnitude of each section of the first meandered conductive path 540 is shown as being the same as the magnitude of each section of the second meandered conductive path 550 that the respective section of the first meandered conductive path 540 overlaps, it will be appreciated that embodiments of the present invention are not limited thereto. As all other aspects of dipole arm 530 may be identical to the dipole arms 330 described above, further description of the dipole arm 530 or the operation thereof will be omitted.

Figure 8:
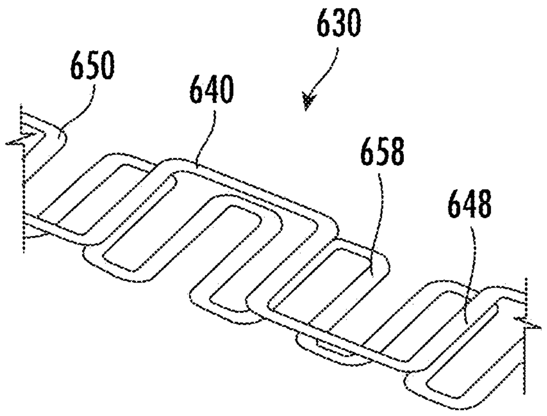

Referring to FIG. 8, a dipole arm 630 according to further embodiments of the present invention includes a first meandered conductive path 640 that is spaced apart from a second meandered conductive path 650. The first and second meandered conductive paths 640, 650 are similar to the respective first and second meandered conductive paths 340, 350 of dipole arm 330 that are described above, but the ratio of the frequency of the square wave defined by the second meandered conductive path 650 to the frequency of the square wave defined by the first meandered conductive path 640 is 3:1 in the dipole arm 630 as compared to 2:1 in the dipole arm 330. Different frequency ratios may be more optimal for radiating elements having different operating frequency bands. As all other aspects of dipole arm 630 may be identical to the dipole arms 330 described above, further description of the dipole arm 630 or the operation thereof will be omitted. It will be appreciated that in other embodiments the ratio of the frequency of the wave defined by the second meandered conductive path on a dipole arm according to embodiments of the present invention to the frequency of the wave defined by the first meandered conductive path on the dipole arm may take on other values such as, for example, 1:1, 4:1, 2.5:1, etc.

Figure 9:
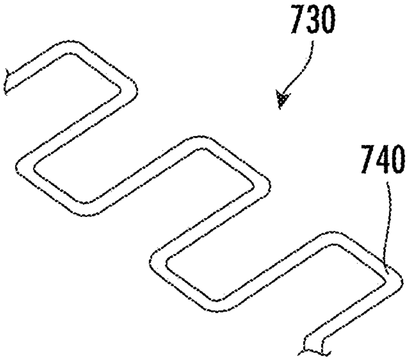

Referring to FIG. 9, a dipole arm 730 according to further embodiments of the present invention only includes a first meandered conductive path 740 and does not include any second meandered conductive path. The inductance of the first meandered conductive path 740 may be selected to suppress mid-band and/or high-band currents while allowing low-band currents to freely flow on the dipole arm 730.

Figure 10:
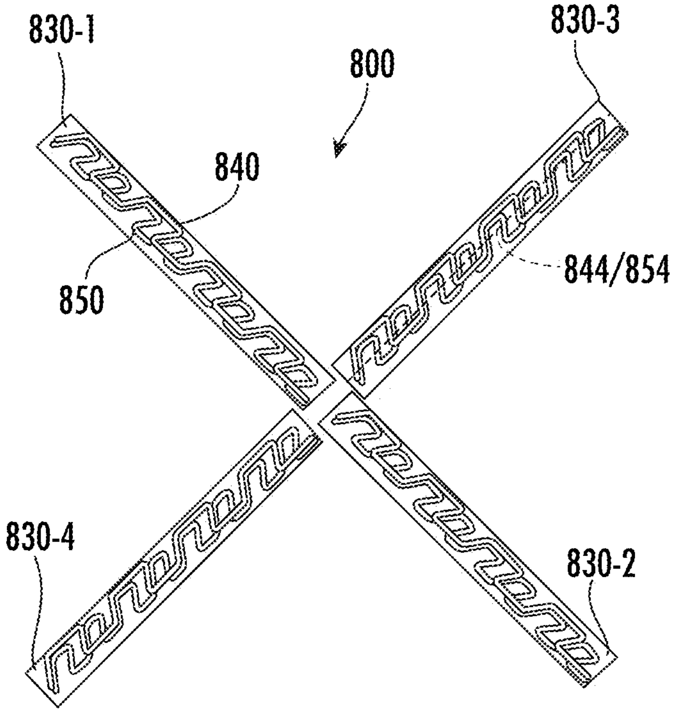
FIG. 10 is a schematic front view of a dipole radiator printed circuit board of a low-band radiating element according to still further embodiments of the present invention.

It will also be appreciated that the low-band radiating elements according to embodiments of the present invention are not limited to having dipole arms with the shape of the dipole arms 330. Instead, the dipole arms may have any appropriate shape such as line shapes, circular shapes, oval shapes, square shapes, etc. For example, FIG. 10 is a schematic front view of the dipole arms 830 of a low-band radiating element 800 according to further embodiments of the present invention that has line shaped dipole arms that each have first and second meandered conductive paths 840, 850 that extend along a single longitudinal axis 844/854.

While the dipole arms of the low-band radiating elements described above are implemented on one or more dipole radiator printed circuit boards, it will be appreciated that embodiments of the present invention are not limited thereto. For example, in other embodiments, any of the above-described radiating elements may be implemented using sheet metal dipole arms that are mounted on a dielectric support. In such embodiments, the first and second meandered conductive paths of each of the above-described radiating elements may be formed by stamping the appropriately shaped structures from sheet metal. The sheet metal-formed first and second meandered conductive paths may then be mounted on opposed sides of a dielectric substrate to form each dipole arm. U.S. Patent Publication No. 2020/0161748 ("the '748 publication") describes techniques for implementing dipole arms as sheet metal on plastic dipole arms. Any of the dipole arms disclosed herein may be implemented using the sheet metal on dielectric designs disclosed in the '748 publication, with sheet metal patterns having the respective first and second conductive paths implemented on either side of a dielectric (e.g., plastic) support. The entire content of the '748 publication is incorporated herein by reference.

So-called "parasitic elements" are routinely used in base station antennas to improve the performance of an associated array of radiating elements included in the antenna. Parasitic elements refer to structures that include one or more conductive patterns that are not coupled to the feed network of the associated array of radiating elements. The parasitic elements are used to alter the radiation patterns or "antenna beams" generated by the associated array of radiating elements in desirable ways.

Parasitic elements are typically mounted forwardly of a reflector of a base station antenna adjacent the radiating elements of the associated array of radiating elements. The parasitic elements are typically designed to be resonant in an operating frequency band of the associated array of radiating elements so that RF energy emitted by the radiating elements will induce currents on the parasitic elements, and these currents cause the parasitic elements to reradiate the RF received energy. The parasitic elements may, for example, have an electrical length that is between one-quarter and one-half of a wavelength that corresponds to a center frequency of the operating frequency band of the associated array of radiating elements. Parasitic elements are typically formed from sheet metal or using printed circuit boards, although other implementations are possible.

Parasitic elements are often used to narrow the azimuth beamwidth of the antenna beams formed by the associated linear array of radiating elements. To accomplish this, first and second columns of parasitic elements may, for example, be mounted along either side of an associated linear array of radiating elements (i.e., each column of parasitic elements extends in the longitudinal direction, and hence parallel to a longitudinal axis of the base station antenna). RF energy transmitted by the associated array of radiating elements that is emitted at relatively larger azimuth angles may impinge upon the parasitic elements and induce currents thereon. These currents cause the parasitic elements to reradiate the RF energy. The parasitic elements are positioned so that the RF energy that is reradiated from the parasitic elements is primarily directed toward the boresight pointing direction of the associated array of radiating elements, thereby focusing the antenna beam in the azimuth plane. The parasitic elements may be designed so that the redirected RF energy substantially constructively combines with the RF energy that is emitted at smaller azimuth angles by the array of radiating elements. Generally speaking, the parasitic elements allow a base station antenna manufacturer to use smaller radiating elements while still achieving desired azimuth beamwidth performance for the antenna beams generated by arrays of these smaller radiating elements.

Figure 11:
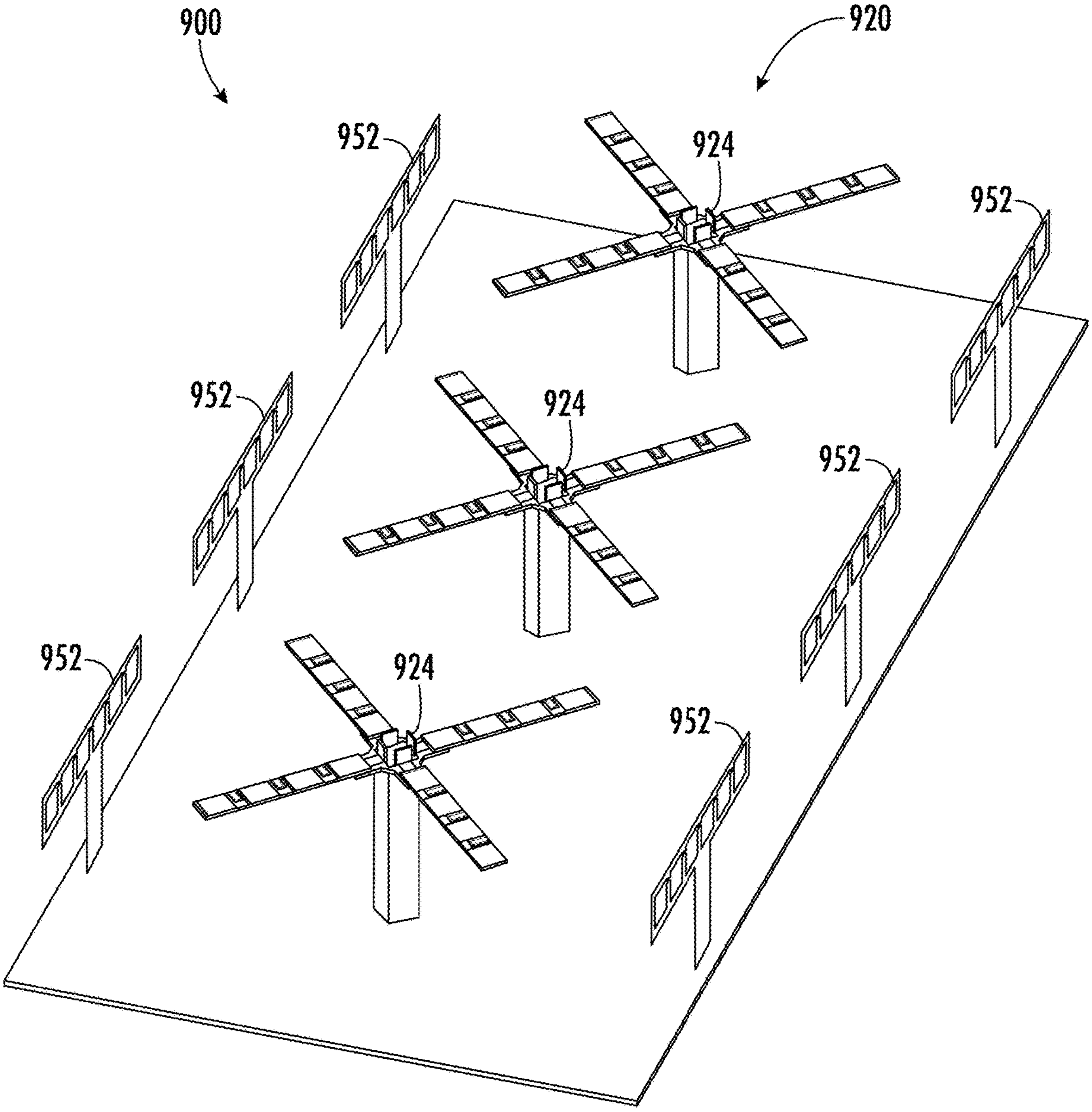
FIG. 11 is a schematic perspective view of a conventional base station antenna that includes a linear array of low-band radiating elements and associated parasitic elements that are positioned on either side of the linear array.

When parasitic elements are used to narrow the azimuth beamwidth of the antenna beams generated by a linear array in the manner discussed above, the parasitic elements are typically mounted forwardly of the reflector and extending parallel to the longitudinal axis of the base station antenna. FIG. 11 is a schematic perspective view of several low-band radiating elements 924 of a linear array 920 of low-band radiating elements 924 that is included in a conventional base station antenna 900, illustrating how parasitic elements 952 may be positioned on either side of each radiating element 924 in order to narrow the azimuth beamwidth of the antenna beams generated by the linear array 920. Since the low-band radiating elements (which usually operate in all or part of the 617-960 MHz frequency band) are typically the largest radiating elements in a base station antenna, parasitic elements that are designed to narrow the azimuth beamwidth of an array of radiating elements are most typically used in conjunction with low-band arrays of radiating elements (since the low-band radiating elements often have the greatest effect on the overall size of a base station antenna).

Figure 12:
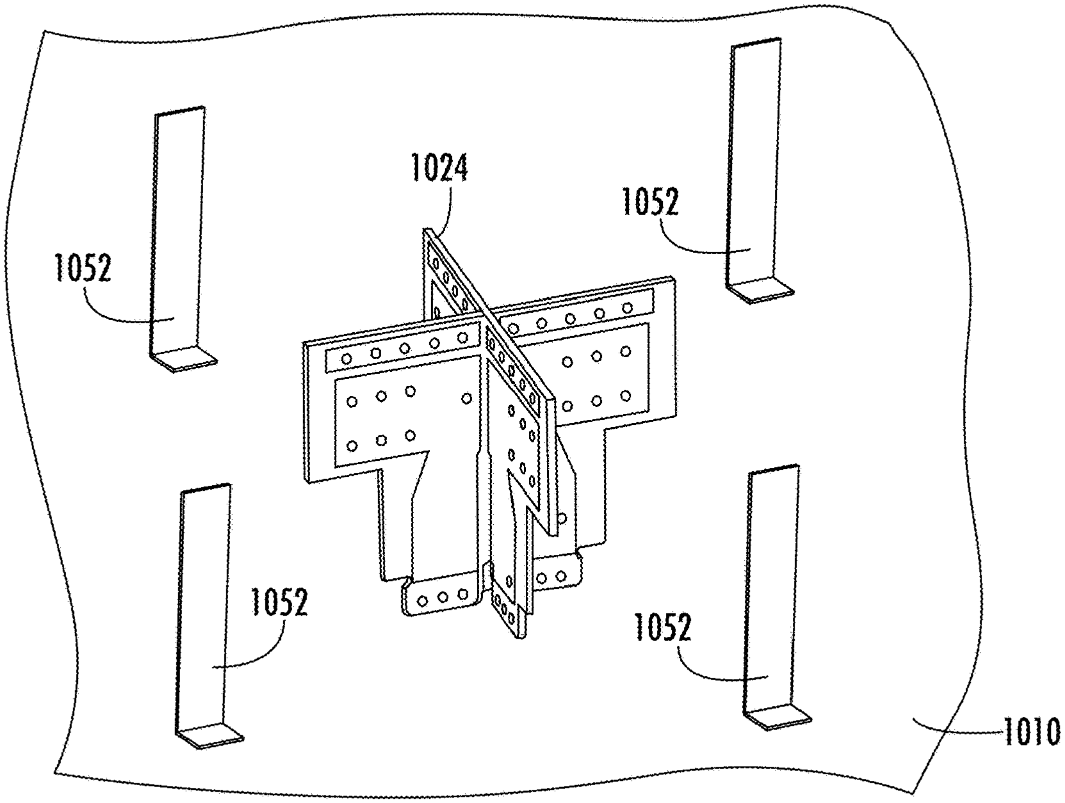
FIG. 12 is a schematic diagram illustrating how parasitic elements that extend forwardly from a reflector of a base station antenna may be positioned around a radiating element to improve the cross-polarization discrimination performance thereof.

Parasitic elements may also be used to, for example, improve the cross-polarization discrimination of an array of radiating elements. This is particularly true with respect to multi-column arrays of radiating elements that are used in beamforming antennas. When the antenna beams generated by such arrays are scanned (typically in the azimuth plane) to large scanning angles, the cross-polarization discrimination of the array often degrades (meaning that the amount of RF energy transmitted at a first polarization that is converted to a second, orthogonal polarization is increased). Parasitic elements that extend forwardly from the reflector may be mounted around the radiating elements of such an array in order to improve the cross-polarization discrimination performance of the array. FIG. 12 is a schematic diagram illustrating how parasitic elements 1052 that extend forwardly from the reflector 1010 (i.e., a longitudinal axis of the parasitic element 1052 is perpendicular to the reflector 1010) may be positioned around a radiating element 1024 (e.g., a radiating element of a multi-column beamforming array of radiating elements) in order to improve the cross-polarization discrimination performance thereof.

One potential difficulty that arises when adding parasitic elements to a base station antenna is that the parasitic elements can impact the antenna beams of more than one array of radiating elements. For example, many base station antennas include a vertically-extending linear array of low-band radiating elements and a pair of vertically-extending linear arrays of mid-band radiating elements that are mounted on either side of the low-band array. In order to keep the width of such base station antennas small, each mid-band linear array may be positioned very close to the low-band array. Because of this close spacing, at least some of the mid-band radiating elements may be mounted "underneath" the low-band radiating elements, meaning that for at least some of the mid-band radiating elements, an axis that is perpendicular to the reflector of the base station antenna extends through both the mid-band radiating element and one of the low-band radiating elements. Herein, when this condition is met the low-band radiating element may be referred to as "overlapping" the mid-band radiating element. In other base station antennas the radiating elements of a low-band array may overlap the radiating elements of a high-band array, or may overlap radiating elements of both a mid-band array and a high-band array.

When radiating elements of different arrays are overlapped as described above, or otherwise are in close proximity, the parasitic elements that are positioned close to a first array of radiating elements are often also close to radiating elements of one or more additional arrays. Moreover, the low-band, mid-band and high-band frequency ranges include frequencies that differ by a factor of two or four, which means that parasitic elements that are resonant in one of the low-band, mid-band and high-band frequency band are often resonant in another of the low-band, mid-band and high-band frequency bands. For example, a parasitic element that has an electrical length of one quarter wavelength at 900 MHz, will have an electrical length of a half wavelength at 1800 MHz and an electrical length of one wavelength at 3600 MHz. Notably, 900 MHz is within the low-band cellular frequency range, 1800 MHz is within the mid-band cellular frequency range, and 3600 MHz is within the high-band cellular frequency range. Thus, the above-described parasitic element may be resonant in all three frequency bands, and hence will tend to impact the antenna beams of any low-band, mid-band and high-band arrays that are in close proximity to the parasitic element.

In practice, it can be difficult to design and position a parasitic element so that it improves the shape of the antenna beams generated by near-by arrays of radiating elements that operate in different frequency bands. In order to address this problem, so-called "cloaking" parasitic elements have been developed. A cloaking parasitic element refers to a parasitic element that is designed to be resonant in an operating frequency band of a first array of radiating elements, but is designed to be substantially transparent to RF energy in the operating frequency band of a second array of radiating elements. This ensures that the parasitic elements only materially impact the antenna beams generated by the first array of radiating elements.

Figure 13A:
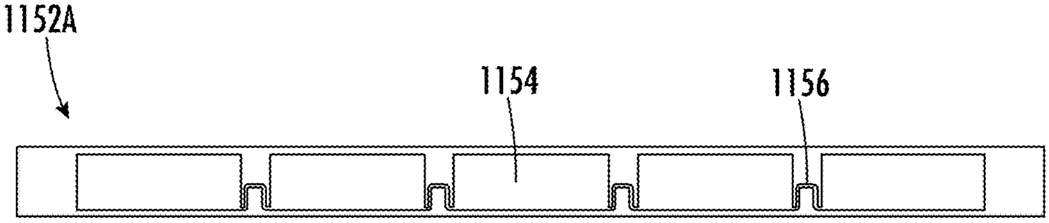
FIGS. 13A-13C are plan views of several conventional cloaking parasitic elements that are designed to be resonant in the low-band cellular frequency band.
Figure 13B:
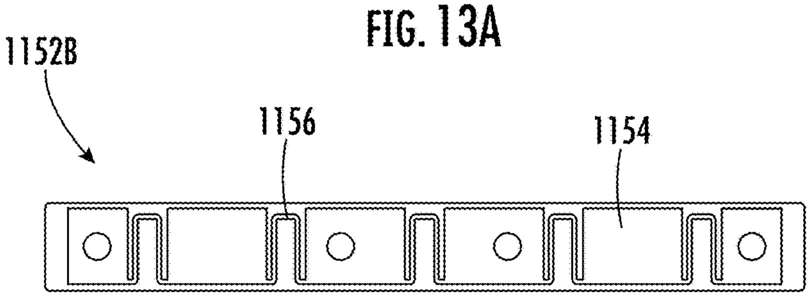
Figure 13C:
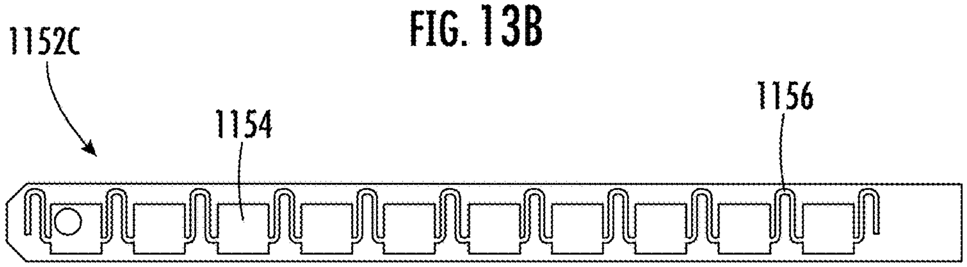

FIGS. 13A-13C are plan views of several conventional cloaking parasitic elements 1152A, 1152B, 1152C that are designed to be resonant in the low-band cellular frequency band, while being substantially transparent to RF energy in a higher frequency band. Each of these parasitic elements 1152A, 1152B, 1152C is implemented using a printed circuit board that has a metal pattern on one side thereof. The metal patterns of the parasitic elements 1152A, 1152B, 1152C are each implemented as a dipole that includes a plurality of widened conductive segments 1154 that are electrically connected in series by a plurality of narrow conductive segments 1156. By appropriately sizing the widened conductive segments 1154 and the narrow conductive segments 1156, the dipole may be made to be substantially transparent to RF energy in the higher frequency band. In effect, the edge capacitance between adjacent widened conductive segments 1154 and the inductance of the narrow conductive segments 1156 acts akin to a filter that allows currents in the low-band to pass while attenuating currents in the higher cellular frequency band. The parasitic element 1152A shown in FIG. 13A is designed to be cloaking over the full mid-band cellular frequency band (1.4-2.7 GHZ). The parasitic element 1152B shown in FIG. 13B is designed to be cloaking over the original mid-band cellular frequency band (1.69-2.7 GHZ). The parasitic element 1152C shown in FIG. 13C is designed to be cloaking over a portion of the high-band cellular frequency band (namely 3.1-4.2 GHZ).

One issue with the conventional parasitic elements of FIGS. 13A-13C is that they tend to act more akin to a band stop filter than as a low pass filter. As a result, the conventional parasitic elements 1152A, 1152B, 1152C of FIGS. 13A-13C typically only provide good performance over either the mid-band or the high-band or, in many cases, for only a portion of the mid-band or high-band cellular frequency bands. As a result, base station antenna manufacturers may need to manufacture and stock a wide variety of different parasitic elements that are designed to be cloaking in different frequency ranges, and select the appropriate parasitic elements to use in each base station antenna design depending upon the types of arrays included therein. Moreover, in recent years the high-band frequency range has been expanded so that now some base station antennas include arrays that operate over the 3.1-5.8 GHz frequency band. Generally speaking, the conventional parasitic element designs shown in FIGS. 13A-13C will not cloak well over such a wide frequency range. As discussed above, if a plurality of low-band parasitic elements mounted adjacent a low-band array are not cloaking over the operating frequency range of an adjacent mid-band or high-band array, it may be difficult to find mounting positions for the parasitic elements that improve the performance of the low-band array without degrading the performance of the adjacent mid-band or high-band array. This same problem may arise when a parasitic element is only cloaking over a portion of the operating frequency band of an adjacent mid-band or high-band array. Thus, the conventional parasitic element designs shown in FIGS. 13A-13C may not work well for low-band arrays that are positioned next to high-band arrays that operate over all or much of the 3.1-5.8 GHz frequency range.

Pursuant to further embodiments of the present invention, parasitic elements for base station antennas are provided that are designed to be resonant with respect to RF energy emitted by low-band radiating elements while being substantially transparent to RF energy emitted by both mid-band and/or high-band radiating elements. In an example embodiment, these parasitic elements may be resonant in some or all of the low-band frequency range (617-960 MHz) while exhibiting good cloaking behavior over the full 1.4-

5.8 GHz frequency band. As such, the cloaking parasitic elements according to embodiments of the present invention may be used across the full range of base station antennas, and may exhibit improved performance as compared to conventional cloaking parasitic elements.

The cloaking parasitic elements according to embodiments of the present invention may comprise first and second stacked meandered conductive paths and may, for example, be substantially identical to the above-described cloaking dipole arms. In other words, the parasitic elements according to embodiments of the present invention may have the same design as the dipole arms of the above-discussed radiating elements according to embodiments of the present invention.

Figure 14A:
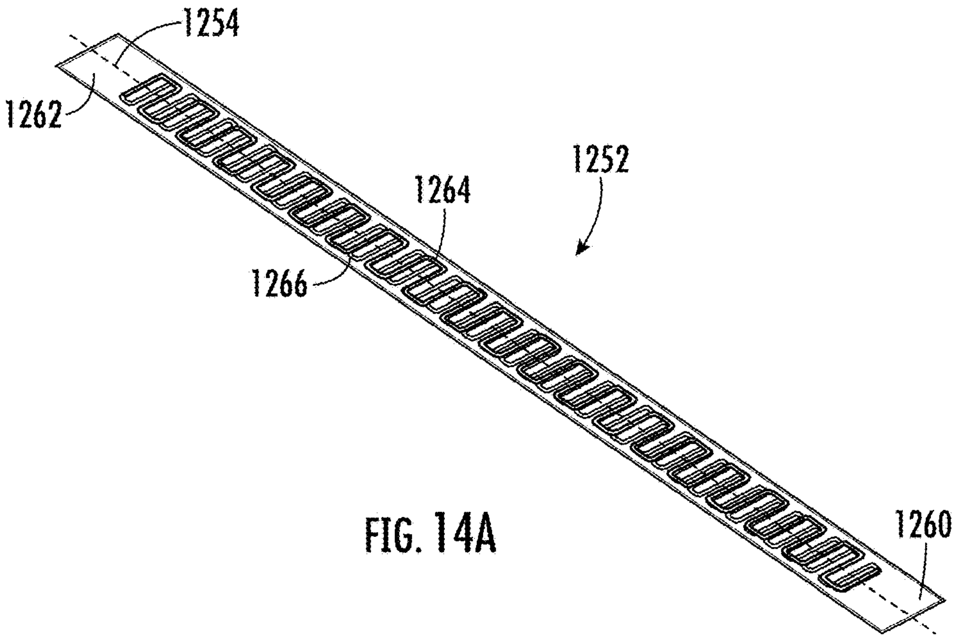
FIG. 14A is a plan view of a cloaking parasitic element according to embodiments of the present invention.
Figure 14B:
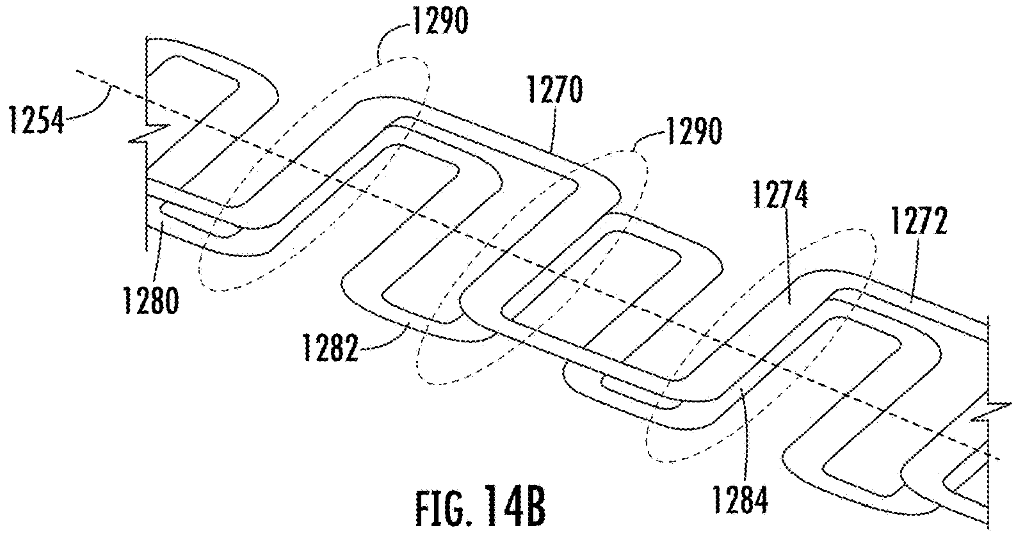
FIG. 14B is a perspective view of two metal patterns included in the cloaking parasitic element of FIG. 14A.
Figure 14C:
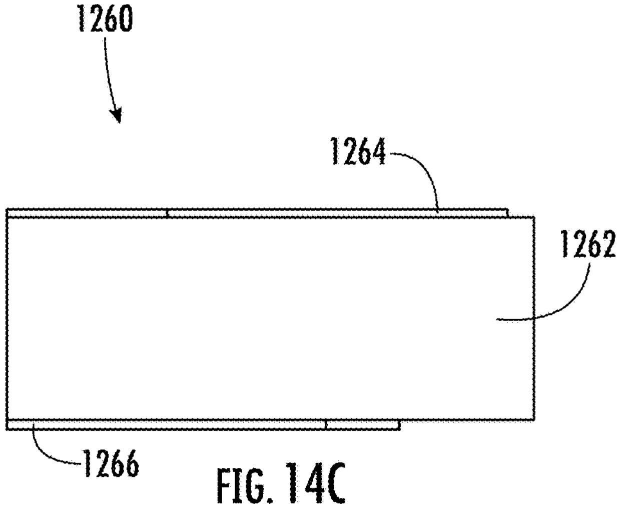
FIG. 14C is a schematic side view of a portion of the cloaking parasitic element of FIG. 14A.

FIGS. 14A-14C illustrate an example embodiment of a cloaking parasitic element 1252 according to embodiments of the present invention. In particular, FIG. 14A is a plan view of the cloaking parasitic element 1252, FIG. 14B is a perspective view of the two metal patterns of the parasitic element 1252, and FIG. 14C is a schematic side view of a portion of the parasitic element 1252.

As shown in FIGS. 14A-14C, the parasitic element 1252 may be implemented on a printed circuit board 1260 that includes a dielectric substrate 1262 and first and second conductive patterns 1264, 1266 formed on opposed sides thereof. The conductive patterns 1264, 1266 may comprise patterned copper, and protective dielectric coatings (not shown) may cover and protect the conductive patterns 1264, 1266. The first conductive pattern 1264 may define a first plane and the second conductive pattern 1266 may define a second plane that is parallel to and spaced apart from the first plane.

As best shown in FIG. 14B, the first conductive pattern 1264 forms a first conductive path 1270 and the second conductive pattern 1266 forms a second conductive path 1280 that is parallel to and spaced apart from the first conductive path 1270. The first and second conductive paths 1270, 1280 may be meandered conductive paths. Each conductive path 1270, 1280 may comprise a thin conductive trace that has a length that is much longer than its width. In the depicted embodiment, the first and second conductive paths 1270, 1280 each have the shape of a square wave. The first meandered conductive path 1270 includes a plurality of first longitudinal segments 1272 that extend generally parallel to a longitudinal axis 1254 of the parasitic element 1252, as well as a plurality of first transverse segments 1274 that extend generally perpendicular to the longitudinal axis 1254 of the parasitic element 1252. Likewise, the second meandered conductive path 1280 includes a plurality of second longitudinal segments 1282 that extend generally parallel to the longitudinal axis 1254 of the parasitic element 1252, as well as a plurality of second transverse segments 1284 that extend generally perpendicular to the longitudinal axis 1254 of the parasitic element 1252. For each conductive path 1270, 1280, the longitudinal segments 1272, 1282 and the transverse segments 1274, 1284 alternate to form the square wave.

At least some of the first transverse segments 1274 overlap respective ones of the second transverse segments 1284 to form a plurality of pairs 1290 of overlapping first and second transverse segments 1274, 1284. As noted above, first and second segments of a conductive path "overlap" if an axis that is perpendicular to a plane defined by the first segment passes through both the first segment and the second segment. In the depicted embodiment, a frequency of the square wave defined by the second meandered conductive path 1280 is twice the frequency of the square wave defined by the first meandered conductive path 1270. Consequently, each first transverse segment 1274 of the first meandered conductive path 1270 overlaps a corresponding second transverse segment 1284 of the second meandered conductive path 1280, but only half the second transverse segments 1284 have a corresponding overlapping first transverse conductive segment 1274.

As with the similar dipole arms discussed above, the pairs 1290 of overlapping first and second transverse segments 1274, 1284 are designed to suppress currents from forming on the first and second meandered conductive paths 1270, 1280 in response to RF radiation emitted by nearby mid-band or high-band radiating elements. In particular, each pair 1290 of overlapping first and second transverse segments 1274, 1284 may be configured so that the instantaneous direction of a first current formed on the first transverse segment 1274 of the pair 1290 in response to RF radiation emitted by nearby mid-band or high-band radiating elements will be substantially opposite the instantaneous direction of a second current formed on the second transverse segment 1284 of the pair 1290 in response to the mid-band or high-band RF radiation, and these opposite currents cancel each other out.

The widths of the metal traces that form the meandered conductive paths 1270, 1280 may be selected so that low-band currents can flow relatively freely on the meandered conductive paths 1270, 1280, while mid-band and/or high-band currents are substantially suppressed. In some embodiments, the width of each meandered conductive path 1270, 1280 may be selected, for example, to be smaller than 0.05 of a wavelength corresponding to the lowest frequency RF signals that are to be suppressed. The use of conductive traces with narrow widths creates an inductive effect that appears as a high impedance to higher frequency RF signals, suppressing current formation by such radiation, while having a sufficiently low impedance for lower frequency RF signals (allowing currents generated by such lower frequency RF signals to flow on the conductive paths 1270, 1280). The meandered conductive paths 1270, 1280 form an LC resonant circuit. By selecting an appropriate width for the traces forming the meandered conductive paths 1270, 1280, the LC circuit may appear as an open circuit at a resonant frequency thereof, which may be at the mid-band/high-band frequencies. Thus, the parasitic element 1252 is designed to allow low-band currents to flow thereon while suppressing formation of mid-band and high-band currents. The suppression will tend to increase with increasing frequency, providing wideband performance.

Additionally, the "length" of each transverse segment 1274, 1284 or, alternatively, the average length of all of the transverse segments on a given conductive path, may be selected to be less than one quarter of a wavelength corresponding to the lowest frequency RF signals that are to be suppressed. Thus, for example, the length of each transverse segment 1274, 1284 (or the average lengths of the transverse segments 1274, 1284 on each conductive path 1270, 1280) may be selected in example embodiments to be less than one-quarter of a wavelength corresponding to a frequency of 1427 MHz or a frequency of 1690 MHz (example lowest frequencies of the operating frequency band of the mid-band radiating elements). In other embodiments, an average length of the transverse segments 1274 on the first meandered conductive path 1270 as well as an average length of the transverse segments 1284 on the second meandered conductive path 1280 may each be less than ¼ of a wavelength corresponding to the center frequency of the operating frequency band of the mid-band radiating elements.

Figure 15:
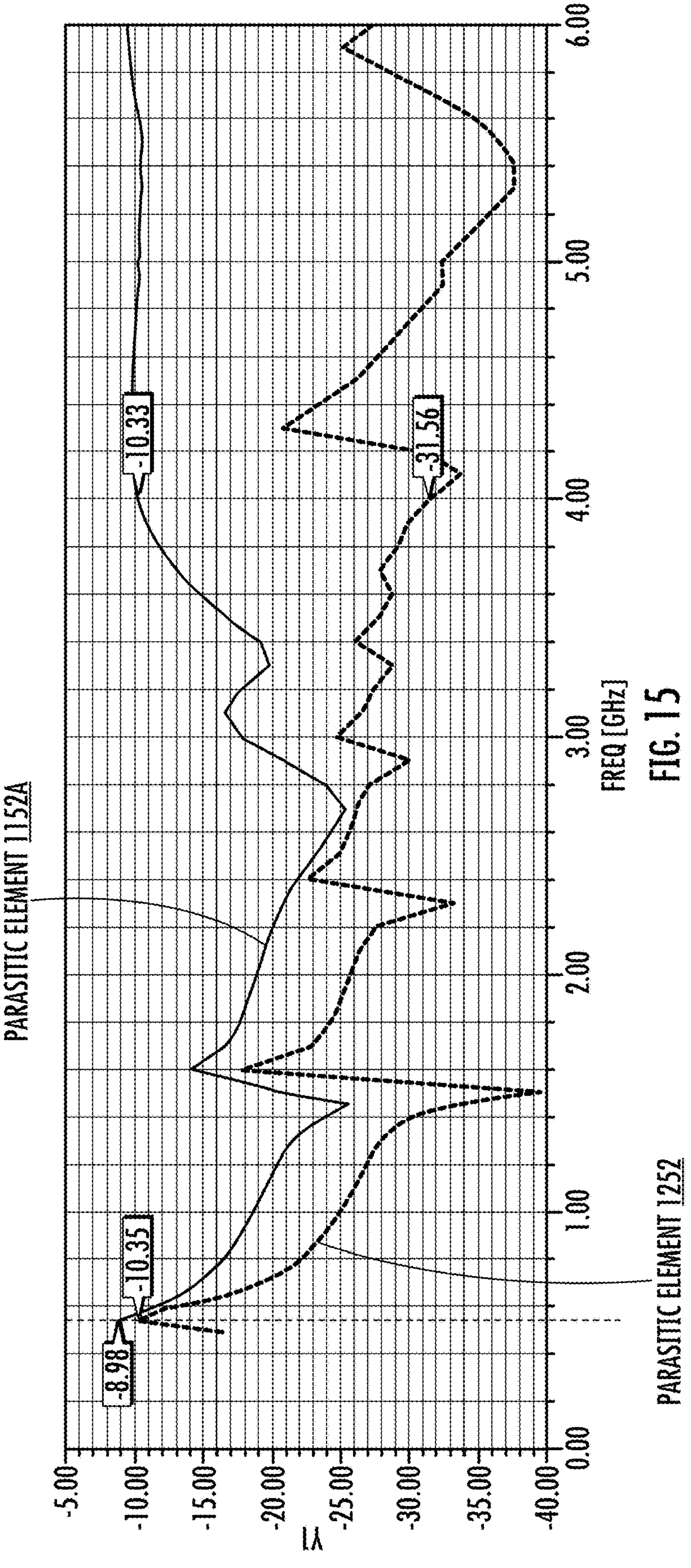
FIG. 15 is a graph that compares the magnitude of the current induced on the conventional parasitic element of FIG. 13A to the magnitude of the current induced on the parasitic element of FIGS. 14A-14C.

FIG. 15 is a graph that compares the magnitude of the current induced on the conventional parasitic element 1152A of FIG. 13A to the magnitude of the current induced on the parasitic element 1252 according to embodiments of the present invention of FIGS. 14A-14C. As can be seen, both parasitic elements 1152A, 1252 are resonant in the low-band frequency range and hence low-band current will flow on both parasitic elements 1152A, 1252, and RF energy radiating in response to these currents will emit in directions that help narrow the azimuth beamwidth of the antenna beams generated by the low-band radiating elements. Both parasitic elements 1152A, 1252 also substantially suppress currents in the traditional mid-band frequency range (1695-2690 MHz). It can be seen, however, that the minimum suppression in this frequency band is significantly higher for the parasitic element 1252 according to embodiments of the present invention since the peak in the response at 1600 MHz for parasitic element 1250 is about 8 dB lower than the peak in the response at 1600 MHz for parasitic element 1152A.

It can also be seen from FIG. 15 that at higher frequencies currents start to readily flow on the conventional parasitic element 1152A. The currents rise to generally unacceptable levels at around 3 GHZ, and climb steadily from there so that at frequencies above 4 GHz the magnitude of the current is within about 1 dB of the peak magnitude of the current in the low-band frequency range. In contrast, the parasitic element 1252 according to embodiments of the present invention continues to exhibit strong cloaking performance throughout the entire 1695-5800 MHz frequency range.

The parasitic element 1252 may be mounted in the manner shown in FIG. 11, namely an array of the parasitic elements 1252 may extend in the longitudinal direction on opposed sides of a low-band array of radiating elements, with the parasitic elements 1252 positioned forwardly of the reflector of the antenna, with the longitudinal axis 1254 of each parasitic element 1252 extending in parallel to the longitudinal axis of the antenna, and with the plane defined by the first major surface of each parasitic element 1252 extending perpendicularly to the reflector. This is shown in FIGS. 16A-16B, which are schematic front views of base station antennas 1300A, 1300B, respectively, that include parasitic elements 1352 according to embodiments of the present invention (e.g., the parasitic elements 1352 could be implemented using the parasitic element 1252 of FIGS. 14A-14C).

Figure 16A:
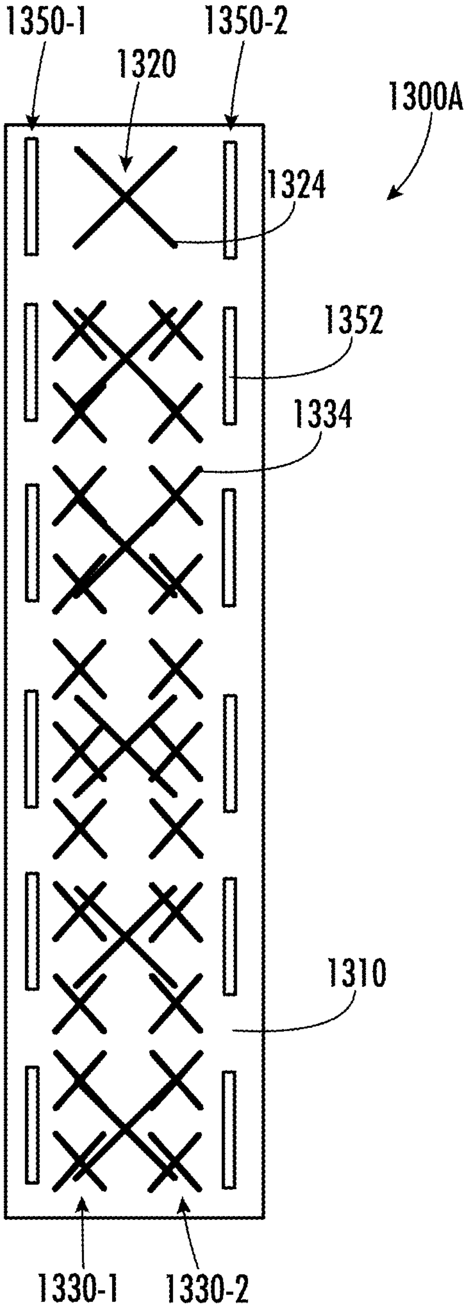
FIGS. 16A and 16B are schematic plan views of base station antennas that include parasitic elements according to embodiments of the present invention.

Referring first to FIG. 16A, the base station antenna 1300A includes a low-band linear array 1320 that comprises a column of low-band radiating elements 1324 and a pair of mid-band arrays 1330-1, 1330-2 that each comprise a column of mid-band radiating elements 1334. All of the radiating elements 1324, 1334 are mounted to extend forwardly from a reflector 1310. The mid-band arrays 1330 are positioned on opposed sides of the low-band linear array 1320. A first array of parasitic elements 1350-1 extends longitudinally so that the first mid-band array 1330-1 is between the first array 1350-1 of parasitic elements 1352 and the low-band array 1320, and a second array 1350-2 of parasitic elements 1352 extends longitudinally so that the second mid-band array 1330-2 is between second array 1350-2 of parasitic elements 1352 and the low-band array 1320.

Figure 16B:
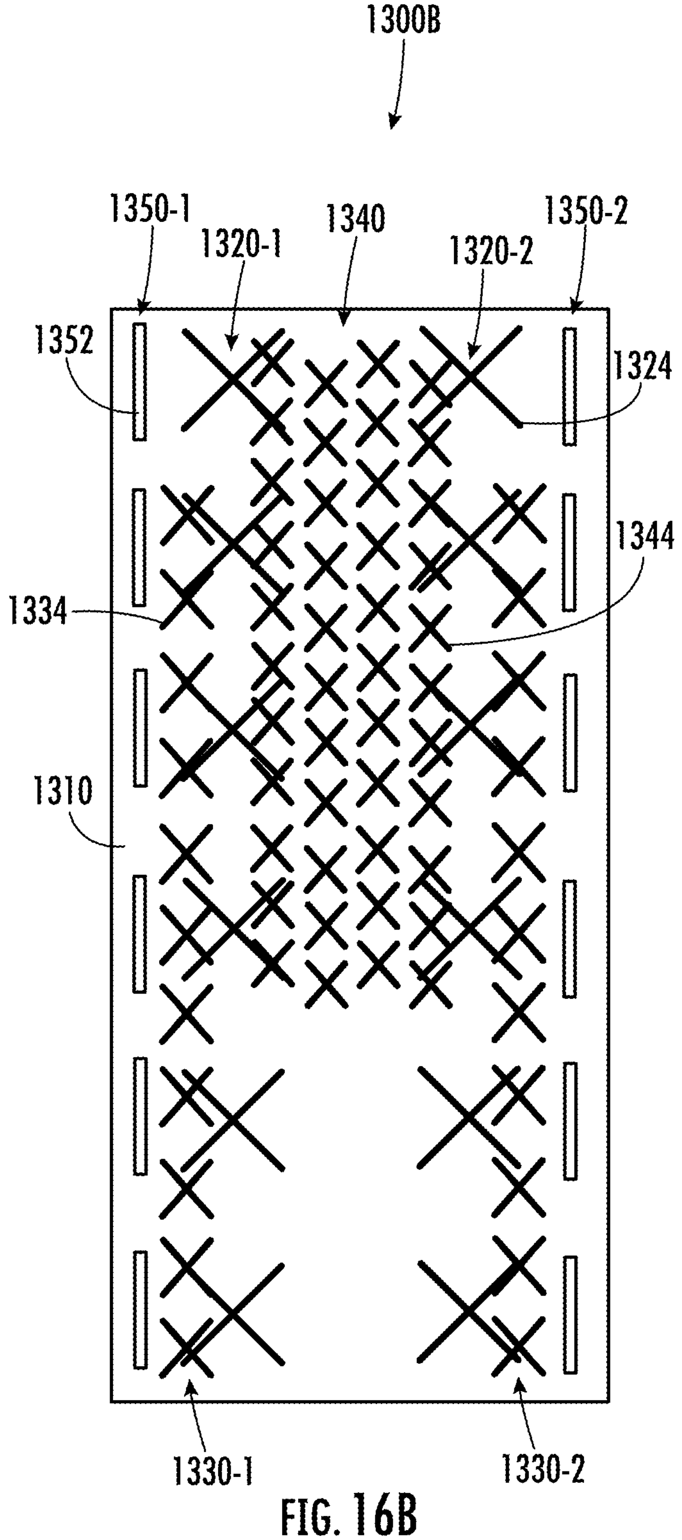

Referring next to FIG. 16B, the base station antenna 1300B includes first and second low-band linear arrays 1320-1, 1320-2 of low-band radiating elements 1324, first and second mid-band linear arrays 1330-1, 1330-2 of mid-band radiating elements, and a multi-column high band array 1340 of high-band radiating elements 1344. The radiating elements 1324, 1334, 1344 are mounted to extend forwardly from a reflector 1310. A first array 1350-1 of parasitic elements 1352 extend longitudinally so that the first mid-band array 1330-1 is between the first array 1350-1 of parasitic elements 1352 and the first low-band array 1320-1, and a second array 1350-2 of parasitic elements 1352 extends longitudinally so that the second mid-band array 1330-2 is between the second array 1350-2 of parasitic elements 1352 and the second low-band array 1320-2. The high-band array 1340 is positioned between the two low-band arrays 1320-1, 1320-2.

While the parasitic elements 1352 shown in FIGS. 16A-16B are mounted so that the plane defined by the first major surface of each parasitic element 1352 extends perpendicularly to the reflector 1310 (i.e., they are mounted as shown in FIG. 11), it will be appreciated that embodiments of the present invention are not limited thereto. For example, in other embodiments each parasitic element 1352 may be rotated 90° about its longitudinal axis so that the first major surface of each parasitic element 1352 extends parallel to the reflector 1310, or may be rotated by an angle other than 90°.

Figure 17:
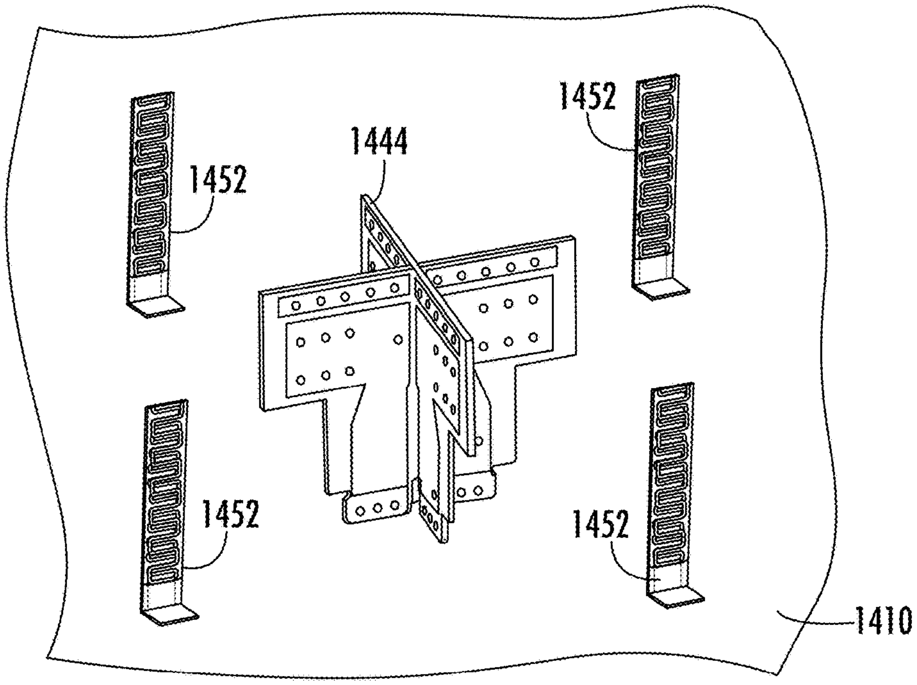
FIG. 17 is a schematic diagram illustrating four additional parasitic elements according to embodiments of the present invention positioned around a radiating element.

It will also be appreciated that the parasitic elements according to embodiments of the present invention may be mounted in other orientations. For example, FIG. 17 illustrates how the conventional parasitic elements 1052 shown in FIG. 12 may be replaced with parasitic elements 1452 according to embodiments of the present invention. Each parasitic element 1452 is mounted to extend forwardly from a reflector 1410, and the parasitic elements 1452 may be mounted to form a box around a radiating element 1444.

Referring again to FIG. 15, in some cases the parasitic elements according to embodiments of the present invention may exhibit reduced passband performance as compared to conventional parasitic elements. For example, as can be seen in FIG. 15, the conventional parasitic element 1152A of FIG. 13A has a peak current in the passband that is almost 1.4 dB higher than the peak current in the passband for the parasitic element 1252 of FIGS. 14A-14C, and the peak current in the passband for the parasitic element 1252 of FIGS. 14A-14C falls off more quickly than does the peak current in the passband for the conventional parasitic element 1152A.

Pursuant to further embodiments of the present invention, base station antennas are provided that include arrays of radiating elements that have associated arrays of parasitic elements that include at least two different parasitic element designs. As discussed above with reference to, for example, FIG. 15, each parasitic element may be resonant at a frequency within the operating frequency band of the associated linear array. This resonant frequency will correspond to the frequency at which the highest current flow will occur on the parasitic element. For some parasitic element designs, the current level may start to drop off somewhat rapidly as the frequency of the RF energy moves away from the resonant frequency, as shown in FIG. 15. When this occurs, the parasitic element may not shape the antenna beam in the desirable fashion across the entire operating frequency band of the associated array of radiating elements.

Figure 18:
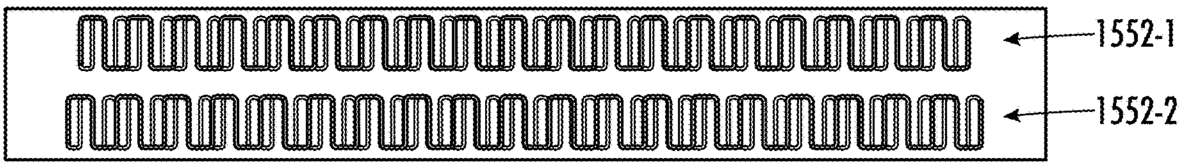
FIG. 18 is a plan view of a double parasitic element that includes a pair of parasitic elements having different resonant frequencies implemented on a printed circuit board.

If higher passband performance is necessary, each parasitic element 1352 in, for example, the base station antennas 1300A, 1300B of FIGS. 16A and 16B may be replaced with a pair of stacked parasitic elements 1552-1, 1552-2 (e.g., stacked in the forward direction of the base station antenna), where each parasitic element 1552 is designed to have a peak resonance at a different frequency within the low-band (e.g., one parasitic element may have peak current flow at 725 MHz while the other has peak current flow at 840 MHz). This may improve the ability of the parasitic elements to shape the low-band antenna beams across the full low-band frequency range, and should not degrade the cloaking ability of the parasitic element. FIG. 18 illustrates an example implementation of such a "double" parasitic element that includes first and second parasitic elements 1552-1, 1552-2 that have different resonant frequencies. As shown in FIG. 18, both parasitic elements 1552-1, 1552-2 may be implemented as part of a single printed circuit board in some embodiments. It will also be appreciated that three or more parasitic elements could be used that each have different resonant frequencies to further improve the performance of the associated array of radiating elements.

As the above description makes clear, pursuant to further embodiments of the present invention, base station antennas are provided that include a reflector and first and second arrays of radiating elements that extend forwardly from the reflector. The radiating elements of the first array operate in a lower operating frequency band (e.g., the 617-960 MHz frequency band or a portion thereof) and the radiating elements of the second array operate in a higher operating frequency band (e.g., the 1427-2690 MHz frequency band or a portion thereof, or the 3.1-5.8 GHz frequency band, or a portion thereof). These antennas also include one or more parasitic elements. For example, the antennas can include a first vertically-extending column of parasitic elements that is positioned on a first side of the first array and a second vertically-extending column of parasitic elements that is positioned on a second, opposed, side of the first array. At least some of the parasitic elements include first and second conductive paths, where the second conductive path is positioned behind the first conductive path. The first conductive path includes a plurality of first segments and the second conductive path includes a plurality of second segments. A subset of the first segments overlap respective ones of the second segments in a subset of the second segments to form a plurality of pairs of overlapping first and second segments. At least some of the pairs of overlapping first and second segments are configured so that the instantaneous direction of a first current formed on the first segment in response to RF radiation emitted by the radiating elements in the second array will be substantially opposite the instantaneous direction of a second current formed on the second segment in response to the RF radiation emitted by the radiating elements of the second array. As a result, the currents induced on the first and second segments may substantially cancel out such that the parasitic elements may be substantially transparent to RF radiation in the second operating frequency band. The parasitic elements may be resonant at frequencies within the first operating frequency band so that the parasitic element will alter properties of the antenna beams generated by the first array in a desirable array. For example, the parasitic elements may narrow an azimuth beamwidth of the antenna beams generated by the first array or may improve the cross-polarization discrimination performance of radiating elements in the first array.

The first and second conductive paths of the above-described parasitic elements may have wave structures (e.g., a square wave, a sine wave, etc.) in some embodiments. The wave structure of the first conductive path may have a first frequency, and the wave structure of the second conductive path may have a second frequency that is different from the first frequency. In some embodiments, the first and second frequencies may differ by substantially multiples of an integer (e.g., a factor of two, a factor of three, etc.).

In some embodiments, the first and second conductive paths may each be meandered conductive paths. The first meandered conductive path may include a plurality of first longitudinal segments that generally extend parallel to a longitudinal axis of the antenna and a plurality of first transverse segments that generally extend perpendicularly to the first longitudinal segments, and the second meandered conductive path may include a plurality of second longitudinal segments that generally extend parallel to the longitudinal axis of the antenna and a plurality of second transverse segments that generally extend perpendicularly to the second longitudinal segments. In some embodiments, substantially all of the first transverse segments may overlap a respective one of the second transverse segments. In some embodiments, in at least some of the pairs of overlapping first and second segments, one of the first and second segments may completely overlap the other of the first and second segments.

In some embodiments, an average width of the first conductive path may be less than 0.05 of a wavelength corresponding to a center frequency of the second operating frequency band, and an average width of the second conductive path may be less than 0.05 of the wavelength corresponding to the center frequency of the second operating frequency band.

The discussion of the parasitic elements according to embodiments of the present invention has focused on parasitic elements having a design that corresponds to the dipole arms of the radiating element described above with reference to FIGS. 4A-4F and 5A-5B. It will be appreciated, however, that the parasitic elements according to embodiments of the present invention may have the designs of any of the cloaking dipole arms described herein, specifically including, for example, the designs discussed above with reference to FIGS. 6-9. Thus, it will be appreciated that the cloaking parasitic elements according to embodiments of the present invention may have a wide variety of different implementations.

When such "double" (or triple) parasitic elements are used, one of the "double" parasitic elements 1552-1, 1552-2 shown in FIG. 18 may, for example, be used to replace each of the parasitic elements 952 shown in the antenna 900 of FIG. 11. The resonant frequency of the first parasitic element may differ from a resonant frequency of the second parasitic element by, for example, at least 5% or at least 10% in example embodiments.

It will be appreciated that many modifications may be made to the above described radiating elements and antennas without departing from the scope of the present invention. For example, the low-band radiating elements described above include a dipole radiator printed circuit board, and each of the four dipole arms are implemented in the dipole radiator printed circuit board. It will be appreciated, however, that in other embodiments, more than one dipole radiator printed circuit board may be used. For example, each dipole arm could be implemented on its own dipole radiator printed circuit board.

While the example embodiments described above have low-band radiating elements that are designed to be transparent to RF energy radiated in two higher frequency bands, it will be appreciated that embodiments of the present invention are not limited thereto. For example, in other embodiments, mid-band radiating elements may be provided that have first dipole arms that are configured to be substantially transparent to RF energy in a lower frequency band and second dipole arms that are configured to be substantially transparent to RF energy in a higher frequency band.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. An antenna, comprising:

a reflector;

a first radiating element extending forwardly from the reflector that is configured to operate in a first operating frequency band;

a second radiating element extending forwardly from the reflector that is configured to operate in a second operating frequency band that encompasses higher frequencies than the first operating frequency band; and a parasitic element that includes a first conductive path and a second conductive path that is positioned behind the first conductive path, wherein the first conductive path includes a plurality of first segments and the second conductive path includes a plurality of second segments, where a subset of the first segments overlap respective ones of the second segments in a subset of the second segments to form a plurality of pairs of overlapping first and second segments, wherein at least some of the pairs of overlapping first and second segments are configured so that an instantaneous direction of a first current formed on the first segment in response to radio frequency ("RF") radiation emitted by the second radiating element will be opposite an instantaneous direction of a second current formed on the second segment in response to the RF radiation emitted by the second radiating element.

2. The antenna of claim 1, wherein the first conductive path comprises a first meandered conductive path and the second conductive path comprises a second meandered conductive path.

3. The antenna of claim 1, wherein the first conductive path is implemented in a first metal layer of a printed circuit board and the second conductive path is implemented in a second metal layer of the printed circuit board.

4. The antenna of claim 2, wherein the first meandered conductive path comprises a plurality of first longitudinal segments that generally extend parallel to a longitudinal axis of the antenna and a plurality of first transverse segments that extend perpendicularly to the first longitudinal segments.

5. The antenna of claim 4, wherein the second meandered conductive path comprises a plurality of second longitudinal segments that extend parallel to the longitudinal axis of the antenna and a plurality of second transverse segments that generally extend perpendicularly to the second longitudinal segments.

6. The antenna of claim 5, wherein at least some of the pairs of overlapping first and second segments comprise a respective one of the first transverse segments and a respective one of the second transverse segments.

7. The antenna of claim 5, wherein all of the first transverse segments overlap a respective one of the second transverse segments.

8. The antenna of claim 1, wherein in at least some of the pairs of overlapping first and second segments, one of the first and second segments completely overlaps the other of the first and second segments.

9. The antenna of claim 2, wherein the first meandered conductive path comprises a wave structure having a first frequency, and the second meandered conductive path comprises a wave structure having a second frequency that is different than the first frequency.

10. The antenna of claim 1, further comprising a third radiating element extending forwardly from the reflector that is configured to operate in a third operating frequency band that encompasses higher frequencies than the second operating frequency band, wherein the parasitic element is configured to be transparent to RF signals in the second operating frequency band and in the third operating frequency band.

11. The antenna of claim 2, wherein an average width of the first meandered conductive path is less than 0.05 of a wavelength corresponding to a center frequency of the second operating frequency band, and an average width of the second meandered conductive path is less than 0.05 of the wavelength corresponding to the center frequency of the second operating frequency band.

12. The radiating element of claim 1, wherein the parasitic element comprises a first parasitic element, the antenna further comprising a second parasitic element that includes a first conductive path and a second conductive path that is positioned behind the first conductive path, wherein the first and second parasitic elements are positioned adjacent the first radiating element, and wherein a resonant frequency of the first parasitic element differs from a resonant frequency of the second parasitic element.

13. The radiating element of claim 12, wherein the resonant frequency of the first parasitic element differs from the resonant frequency of the second parasitic element by at least 5%.

14. The radiating element of claim 12, wherein the first and second parasitic elements are implemented in a common printed circuit board.

15. An antenna, comprising:

a first radiating element that is configured to operate in a first operating frequency band;

a second radiating element that is configured to operate in a second operating frequency band that does not overlap with the first operating frequency band and that encompasses higher frequencies than the first operating frequency band; and a parasitic element positioned adjacent the first radiating element and the second radiating element, the parasitic element including a first conductive path having a wave structure with a first frequency and a second conductive path having a wave structure with a second frequency that is positioned behind the first conductive path, where the first frequency is different from the second frequency.

16. The antenna of claim 15, wherein an average width of the first conductive path is less than 0.05 of a wavelength corresponding to a center frequency of the second operating frequency band, and an average width of the second conductive path is less than 0.05 of the wavelength corresponding to the center frequency of the second operating frequency band.

17. The antenna of claim 15, wherein the first conductive path comprises a plurality of first longitudinal segments that extend parallel to a longitudinal axis of the antenna and a plurality of first transverse segments that generally extend perpendicularly to the first longitudinal segments, and the second conductive path comprises a plurality of second longitudinal segments that generally extend parallel to the longitudinal axis of the antenna and a plurality of second transverse segments that extend perpendicularly to the second longitudinal segments.

18. The antenna of claim 17, wherein at least some of the first transverse segments overlap respective ones of the second transverse segments.

19. The antenna of claim 18, wherein all of the first transverse segments overlap a respective one of the second transverse segments.

20. The antenna of claim 15, wherein the parasitic element comprises a first parasitic element, the antenna further comprising a second parasitic element that includes a first conductive path and a second conductive path that is positioned behind the first conductive path, wherein the first and second parasitic elements are positioned adjacent the first radiating element, and wherein a resonant frequency of the first parasitic element differs from a resonant frequency of the second parasitic element.

* * * * *